(12) United States Patent
Li et al.

(10) Patent No.: US 12,493,876 B2
(45) Date of Patent: Dec. 9, 2025

(54) DATA PROCESSING METHOD AND APPARATUS BASED ON NODE INTERNAL MEMORY, DEVICE AND MEDIUM

(71) Applicant: TENCENT TECHNOLOGY (SHENZHEN) COMPANY LIMITED, Guangdong (CN)

(72) Inventors: Maocai Li, Guangdong (CN); Zongyou Wang, Guangdong (CN); Hu Lan, Guangdong (CN); Gengliang Zhu, Guangdong (CN); Pan Liu, Guangdong (CN); Kaiban Zhou, Guangdong (CN); Yifang Shi, Guangdong (CN); Huankun Huang, Guangdong (CN); Jinsong Zhang, Guangdong (CN); Li Kong, Guangdong (CN); Zhiyong Liao, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 431 days.

(21) Appl. No.: 18/074,020

(22) Filed: Dec. 2, 2022

(65) Prior Publication Data

US 2023/0109969 A1    Apr. 13, 2023

Related U.S. Application Data

(63) Continuation of application No. PCT/CN2022/071270, filed on Jan. 11, 2022.

(30) Foreign Application Priority Data

Jan. 18, 2021 (CN) .......................... 202110063372.9

(51) Int. Cl.
*G06F 12/00* (2006.01)
*G06F 16/22* (2019.01)
(Continued)

(52) U.S. Cl.
CPC ....... *G06Q 20/389* (2013.01); *G06F 16/2255* (2019.01); *G06Q 20/3827* (2013.01);
(Continued)

(58) Field of Classification Search
CPC ......................................................... G06F 3/06
(Continued)

(56) References Cited

U.S. PATENT DOCUMENTS 12,061,569 B2 *   8/2024   Wu ..................... G06F 11/1464
12,111,852 B2 *  10/2024   Vo ........................ G06F 16/215
(Continued)

FOREIGN PATENT DOCUMENTS

CN       110020859 A       7/2019
CN       110175188 A       8/2019
(Continued)

OTHER PUBLICATIONS

International Search Report for PCT/CN2022/071270 dated Apr. 6, 2022.
(Continued)

*Primary Examiner* — Mohamed M Gebril
(74) *Attorney, Agent, or Firm* — Sughrue Mion, PLLC

(57) ABSTRACT

A data processing method and apparatus based on a node internal memory, a device and a computer readable storage medium are provided. The method includes: acquiring a data reading contract associated with a transaction in a first block from a chain reading cache of the node internal memory; invoking the data reading contract to acquire a write cache mapping table associated with the first block, and determining target read data associated with the transaction based on a first block cache of the first block in the write cache mapping table; and executing the transaction based on the target read data, storing target cached data, corresponding to a result of executing of the transaction, to the first block cache, and writing the first block into a bifurcated blockchain.

20 Claims, 12 Drawing Sheets

(51) Int. Cl.
  *G06Q 20/38* (2012.01)
  *G06Q 20/40* (2012.01)
  *H04L 9/00* (2022.01)
  *G06F 16/2455* (2019.01)

(52) U.S. Cl.
  CPC .......... *G06Q 20/4014* (2013.01); *H04L 9/50* (2022.05); *G06F 16/24552* (2019.01)

(58) Field of Classification Search
  USPC ........................................................ 711/154
  See application file for complete search history.

(56) References Cited

U.S. PATENT DOCUMENTS

| | | | | |
|---|---|---|---|---|
| 2018/0158493 | A1* | 6/2018 | Ryu | ..................... G11C 11/5642 |
| 2020/0120157 | A1* | 4/2020 | Xie | ....................... H04L 9/0643 |
| 2020/0143372 | A1 | 5/2020 | Liu et al. | |
| 2021/0334275 | A1* | 10/2021 | Smart | .................. G06F 16/2456 |
| 2022/0301650 | A1* | 9/2022 | Lee | ..................... G11C 16/3404 |
| 2023/0176741 | A1* | 6/2023 | McNeil | ................. G06F 3/0613 |

FOREIGN PATENT DOCUMENTS

| | | |
|---|---|---|
| CN | 110493148 A | 11/2019 |
| CN | 110990490 A | 4/2020 |
| CN | 111045792 A | 4/2020 |
| CN | 111340470 A | 6/2020 |
| CN | 112380149 A | 2/2021 |
| CN | 113094396 A | 7/2021 |

OTHER PUBLICATIONS

Written Opinion for PCT/CN2022/071270 dated Apr. 6, 2022.
Chinese Office Action for Application No. 202110063372.9 dated Mar. 1, 2021.

* cited by examiner

DATA PROCESSING METHOD AND APPARATUS BASED ON NODE INTERNAL MEMORY, DEVICE AND MEDIUM

CROSS-REFERENCE TO RELATED APPLICATION(S)

This application is a continuation application of International Application No. PCT/CN2022/071270, filed Jan. 11, 2022, which claims priority to Chinese Patent Application No. 202110063372.9, filed with the National Intellectual Property Administration, PRC on Jan. 18, 2021, the disclosures of which are herein incorporated by reference in their entireties.

FIELD

The disclosure relates to the technical field of data processing, and in particular to a data processing technology based on a node internal memory.

BACKGROUND

At present, when miner nodes in a blockchain system are mining, due to the delay of a network, a plurality of miner nodes (such as two miner nodes) will simultaneously calculate hash values that satisfy a condition since a hash value is generated randomly, and it is possible that a plurality of blocks (such as block 1A and block 1B) are simultaneously mined. In this case, if the two miner nodes keep accounts together, that is, if the two miner nodes write block 1A and block 1B into a blockchain database of the blockchain at the same time, a bifurcation phenomenon of the blockchain will be caused.

It can be seen that after data in block 1A and data in block 1B are jointly written into the blockchain database of the blockchain, if a transaction in a certain block (for example, block 1A) is required to be queried or verified, it is necessary to access relevant data of the transaction in block 1A from the blockchain, thereby reducing the data access efficiency.

SUMMARY

One or more example embodiments of the disclosure provide a data processing method and apparatus based on a node internal memory, a device and a computer-readable medium, which may improve the data access efficiency.

An aspect of an example embodiment of the disclosure provides a data processing method based on a node internal memory, the method is implemented by a blockchain node, and includes:

acquiring a transaction in a first block, and acquiring a data reading contract associated with the transaction from a chain reading cache of the node internal memory; the first block being a block to be written into a bifurcated blockchain in the node internal memory;

invoking the data reading contract to acquire a write cache mapping table associated with the first block, and determining target read data associated with the transaction based on a first block cache of the first block in the write cache mapping table; and executing the transaction based on the target read data, storing target cached data, corresponding to a result of executing of the transaction, to the first block cache, and writing the first block into the bifurcated blockchain.

An aspect of an example embodiment of the disclosure provides a data processing apparatus based on a node internal memory, the apparatus is deployed on a blockchain node, and includes at least one memory configured to store program code; and at least one processor configured to read the program code and operate as instructed by the program code, the program code including:

transaction acquisition code configured to cause the at least one processor to acquire a transaction in a first block, and acquire a data reading contract associated with the transaction from a chain reading cache of the node internal memory; the first block being a block to be written into a bifurcated blockchain in the node internal memory;

contract invoking code configured to cause the at least one processor to invoke the data reading contract to acquire a write cache mapping table associated with the first block, and determine target read data associated with the transaction based on a first block cache of the first block in the write cache mapping table; and transaction execution code configured to cause the at least one processor to execute the transaction based on the target read data, store target cached data, corresponding to a result of executing of the transaction, to the first block cache, and write the first block into the bifurcated blockchain.

An aspect of an example embodiment of the disclosure provides a computer device, including: a processor and a memory, the processor being connected to the memory, the memory being configured to store a computer program, the computer program, when executed by the processor, causing the computer device to perform the method according to the embodiments of the disclosure.

An aspect of an example embodiment of the disclosure provides a non-transitory computer-readable storage medium, storing a computer program, the computer program being loaded and executed by a processor to cause a computer device with the processor to perform the method according to the embodiments of the disclosure.

An aspect of an example embodiment of the disclosure provides a computer program product or a computer program, including computer instructions, the computer instructions being stored in a computer-readable storage medium. A processor of a computer device reads the computer instructions from the computer-readable storage medium and executes the computer instructions to cause the computer device to perform the method according to the embodiments of the disclosure.

BRIEF DESCRIPTION OF THE DRAWINGS

To describe the technical solutions of the disclosure or the related technology more clearly, the following briefly introduces the accompanying drawings required for describing the embodiments or the related technology. The accompanying drawings in the following description show some embodiments of the disclosure, and a person skilled in the art may still derive other drawings from these accompanying drawings without creative efforts.

DETAILED DESCRIPTION

The technical solutions of the disclosure are clearly and completely described below with reference to the accompanying drawings of the disclosure. Apparently, the described embodiments are merely some rather than all of the embodiments of the disclosure. All other embodiments obtained by a person of ordinary skill in the art based on the embodiments of the disclosure without creative efforts shall fall within the protection scope of the disclosure.

Figure 1:
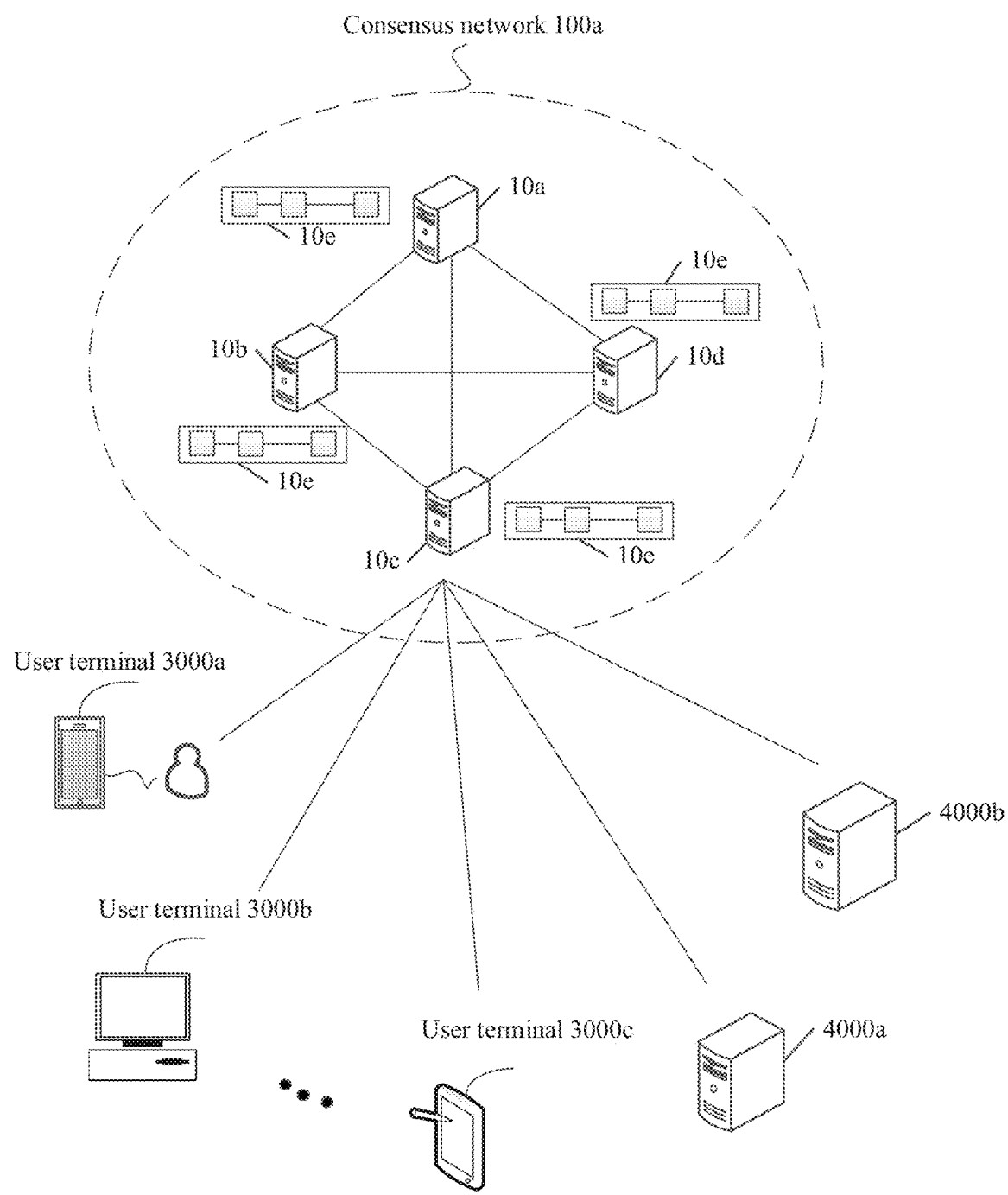
FIG. 1 is a schematic diagram of a network architecture provided by an embodiment of the disclosure.

FIG. 1 is a schematic diagram of a network architecture provided by an embodiment of the disclosure. The network architecture shown in FIG. 1 may be applied to a blockchain system which may be a distributed system formed by connecting multiple nodes in a manner of network communication. The blockchain system may include, but is not limited to, a blockchain system corresponding to a consortium blockchain.

It is to be understood that a blockchain is a new-type application mode of a computer technology such as distributed data storage, peer-to-peer transmission, a consensus mechanism, and an encryption algorithm. It is mainly used for organizing data in a chronological order and encrypting the data into ledgers, so that the data cannot be tampered or forged, but may be verified, stored and updated. The blockchain is essentially a decentralized database. Each node in the database stores an identical blockchain. A blockchain network divides nodes into core nodes and Simplified Payment Verification (SPV) nodes. The core nodes may be responsible for the consensus of the whole blockchain network, that is, the core nodes may be consensus nodes in the blockchain network. A process of writing transaction data into a ledger (for example, a local ledger) in the blockchain network may be as follows. A client sends the transaction data to an SPV node, and then the transaction data is transferred among the SPV nodes in the blockchain network in a relay baton manner, until the consensus node receives the transaction data; the consensus node then packs the transaction data into a block for subsequent consensus with other consensus nodes in the future, so that after the consensus succeeds, the block carrying the transaction data is written into the local ledger (for example, written into a bifurcated blockchain), and the block carrying the transaction data may be subsequently written into a blockchain database (or may be referred to as a database) corresponding to a target blockchain. The target blockchain may be understood as the longest chain constructed by these consensus nodes according to the bifurcated blockchain that supports a bifurcation characteristic.

It is to be understood that the blockchain system may include a smart contract. The smart contract may be understood as a code that may be understood and executed by each node (including the consensus nodes) of a blockchain, and may execute any logic and obtain a result. A user may invoke the smart contract that has been deployed on the blockchain by initiating a transaction request through the client, and then a data node or SPV node on the blockchain may send the transaction request to the consensus nodes to invoke the smart contracts running in the various consensus nodes to execute a transaction requested by the user. It is to be understood that the blockchain may include one or more smart contracts, and these smart contracts may be distinguished by contract invoking addresses, contract identity documents (IDs) or contract names, and the transaction request initiated by the client may also carry the contract invoking addresses or contract IDs or contract names of the smart contracts to specify the smart contract that needs to be run. If the smart contract specified by the client is a contract with data needing to be read (that is, a data reading contract), each consensus node will access the local ledger (for example, each node may quickly access a multi-level cache constructed in a node internal memory through a block chain structure) to read the data; and finally, the various consensus nodes will verify whether respective transaction execution results are consistent (that is, making a consensus); and if the transaction execution results are consistent, the transaction execution results may be stored into write caches of the respective local ledgers, and the transaction execution results of the transaction may be returned to the client.

It is to be understood that the network architecture shown in FIG. 1 may include a core node (e.g., consensus node) cluster, an SPV node cluster and a user terminal cluster. The core node cluster may include a plurality of core nodes. The plurality of core nodes may include a node 10a, a node 10b, a node 10c, and a node 10d shown in FIG. 1. As shown in FIG. 1, the node 10a, the node 10b, and the node 10d may be respectively connected with the node 10c via a network, so as to form a consensus network 100a shown in FIG. 1. It is to be understood that in the consensus network 100a, the node 10a, the node 10b, and the node 10d may all perform data interaction through the network connection with the node 10c. In addition, the user terminal cluster may include a plurality of user terminals. The plurality of user terminals may include a user terminal 3000a, a user terminal 3000b, . . . , and a user terminal 3000c shown in FIG. 1. As shown in FIG. 1, the user terminal 3000a, the user terminal 3000b, . . . , and the user terminal 3000c may be respectively connected with the node 10c via a network, so as to perform data interaction through the network connection with the node 10c. The SPV node cluster may include a plurality of data nodes. The plurality of data nodes may include a data node 4000*a* and a data node 4000*b* shown in FIG. 1. The data node 4000*a* and the data node 4000*b* may be used as SPV nodes which are respectively connected with other user terminals via a network, so that other user terminals may perform data interaction with the node 10*c* through the data node 4000*a* and the data node 4000*b*.

In this embodiment of the disclosure, each core node (for example, the node 10*a*, the node 10*b*, the node 10*c*, and the node 10*d*) in the consensus network 100*a* may be collectively referred to as a blockchain node. It is to be understood that these blockchain nodes may all be used for maintaining the same blockchain (for example, a blockchain 10*e* shown in FIG. 1 may be the target blockchain). A Peer to Peer (P2P) network may be formed between any two blockchains in the consensus network 100*a*. The P2P network may adopt a P2P protocol. The P2P protocol is an application layer protocol running over a Transmission Control Protocol (TCP). In a distributed system, any device such as a server and a terminal may be added to serve as a blockchain node. Each blockchain node may include a hardware layer, an intermediate layer, an operating system layer and an application layer.

In this embodiment of the disclosure, one blockchain node may be bound to any role (for example, any individual user, any enterprise, any institution and other entity objects) accessing the blockchain network, so that the blockchain network including these blockchain nodes is collectively referred to as a consortium blockchain network. Therefore, the node 10*a*, the node 10*b*, the node 10*c*, and the node 10*d* shown in FIG. 1 may have a one-to-one correspondence relationship with corresponding roles (that is, entity objects in corresponding transaction scenarios) that need to be connected to the consortium blockchain network. The transaction scenarios may include an electronic bill scenario, a social scenario, a credit purchase scenario, a credit scenario, and the like. At this time, a target transaction in the corresponding transaction scenario may include an electronic bill transaction, a social transaction, a credit purchase transaction, a credit transaction and the like, and the specific transactions in the corresponding transaction scenarios will not be listed one by one here.

It is to be understood that since each entity object may correspond to one blockchain node, in this embodiment of the disclosure, the entity objects being the enterprise users may be taken as an example. The blockchain nodes associated with each enterprise user may be the same blockchain node (for example, the node 10*c* shown in FIG. 1 may perform data interaction with user terminals corresponding to a plurality of enterprise users). For example, in a blockchain electronic bill system, the electronic bill transaction (such as a registration transaction, an invoicing transaction, and a bill transfer transaction) corresponding to each invoicing enterprise may be collectively referred to as a transaction. An invoicing enterprise A may perform data interaction with the node 10*c* shown in FIG. 1 through the user terminal 3000*a* shown in FIG. 1 to complete a corresponding transaction; by analogy, an invoicing enterprise B may perform data interaction with the node 10*c* shown in FIG. 1 through the user terminal 3000*b* shown in FIG. 1 to complete a corresponding transaction; and an invoicing enterprise C may perform data interaction with the node 10*c* shown in FIG. 1 through the user terminal 3000*c* shown in FIG. 1 to complete a corresponding transaction.

In this embodiment of the disclosure, entity objects (for example, the invoicing enterprise A, the invoicing enterprise B, and the invoicing enterprise C) that send a transaction request for an electronic bill transaction may be collectively referred to as a first user, and the blockchain nodes that receive the transaction request sent by the first user (for example, the invoicing enterprise A, the invoicing enterprise B, and the invoicing enterprise C) may be collectively referred to as the data node; and the blockchain nodes participating in the consensus of the transaction request may also be collectively referred to as the core node.

In the consensus network 100*a*, since the node 10*c* may perform data synchronization with other blockchain nodes that are in network connection (also referred to as session connection) with the node 10*c*, that is, the node 10*c* may synchronize corresponding transaction data information from other blockchain nodes (for example, synchronize the transaction requests sent by other enterprise users from other blockchain nodes), at this time, the data nodes associated with each enterprise user may be different blockchain nodes. For example, the invoicing enterprise A may also perform data interaction with the node 10*c* shown in FIG. 1 through the user terminal 3000*a* shown in FIG. 1; the invoicing enterprise B may also perform data interaction with the node 10*b* shown in FIG. 1 through the user terminal 3000*b* shown in FIG. 1; and the invoicing enterprise C may also perform data interaction with the node 10*a* shown in FIG. 1 through the user terminal 3000*c* shown in FIG. 1. Since these nodes in the blockchain network will maintain the same blockchain, a network load in the blockchain network may be effectively balanced by means of randomly allocating the transaction requests sent by different user terminals to the blockchain nodes associated with the blockchain 10*e*, so that the processing efficiency for transaction data corresponding to the corresponding transactions may be improved.

For another example, in a credit system, a credit transaction requested by the first user (for example, a user corresponding to the user terminal 3000*a*) may be understood as another transaction. The first user may perform data interaction with the node 10*c* shown in FIG. 1 through the user terminal 3000*a* shown in FIG. 1 to send a transaction request for the corresponding transaction to the node 10*c*. That is, in the credit system, one blockchain node may be configured for each user accessing the credit system to receive the transaction request sent by the corresponding user. It is to be understood that each user in this embodiment of the disclosure may also be collectively referred to as an entity object. For example, the entity object requesting the aforementioned credit transaction may be the aforementioned individual user, enterprise user, or the like.

It is to be understood that when the data node receives the transaction request, the data node may forward the transaction request initiated by the first user to the core node, so as to verify the validity of the transaction request initiated by the first user through the core node. In this way, the core node may add the transaction requested by the first user to a transaction pool when the validity verification succeeds, so that the transaction data associated with the transaction may be packed into a block later, and it is convenient to subsequently make a consensus with other consensus nodes. After the consensus succeeds, the block carrying the transaction data of the transaction may be written into the local ledger, so that the block carrying the transaction data may be subsequently written into the blockchain database (or may be referred to as a database).

Figure 2:
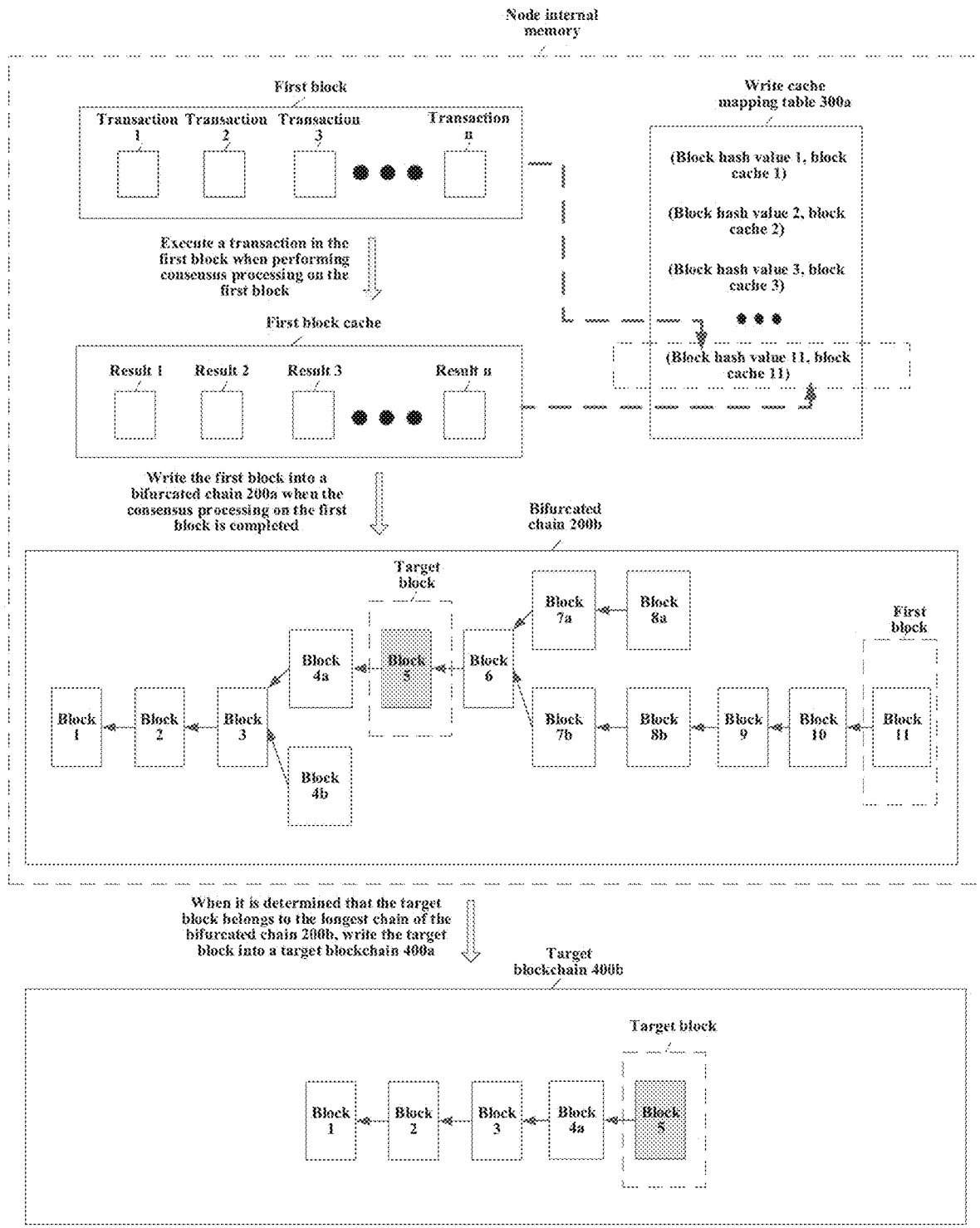
FIG. 2 is a schematic diagram of a scenario of executing a first block in a node internal memory and submitting a target block provided by an embodiment of the disclosure.

For ease of understanding, FIG. 2 is a schematic diagram of a scenario of executing a first block in a node internal memory and submitting a target block provided by an embodiment of the disclosure. The first block shown in FIG. 2 may be a block that is obtained after a certain blockchain node (for example, the node 10*c*) in the consensus network 100a packs transaction data of a plurality of transactions in the transaction pool at a current time T1 and is to be written into a bifurcated blockchain. In this embodiment of the disclosure, a bifurcated chain 200a and a bifurcated chain 200b may be collectively referred to as a bifurcated chain blockchain. The bifurcated chain 200a may be a bifurcated blockchain before the first block is written. The bifurcated chain 200b may be a bifurcated blockchain after the first block is successfully written. The first block as shown in FIG. 2 may contain a plurality of transactions. The plurality of transactions may include: a transaction 1, a transaction 2, a transaction 3, . . . , and a transaction n shown in FIG. 2.

It is to be understood that in order to avoid waste of storage resources on a chain, in this embodiment of the disclosure, after the consensus processing is performed on the blocks generated by packing, the blocks succeeding in consensus are temporarily written into a bifurcated blockchain (for example, the bifurcated chain 200a that supports bifurcation) of the node internal memory shown in FIG. 2 to obtain the bifurcated chain 200b shown in FIG. 2. It is to be understood that the bifurcated chain 200b may be a new bifurcated blockchain formed after the current block is successfully written into the bifurcated chain 200a.

As shown in FIG. 2, the blockchain node (for example, the node 10c) may save a transaction execution result of a transaction in the first block to a write cache of the first block after performing the consensus processing on the first block (e.g., execute the transaction in the first block). As shown in FIG. 2, a block hash value of the first block may be a block hash value 11 in a write cache mapping table 300a shown in FIG. 2. In addition, a write cache corresponding to the first block may be a block cache 11 in the write cache mapping table 300a shown in FIG. 2.

For example, when the node 10c packs to obtain the first block to be written into the bifurcated blockchain, the first block may be broadcasted to other blockchain nodes (for example, the node 10a, the node 10b, and the node 10d shown in FIG. 1) in the consensus network 100a, so that other blockchain nodes (e.g., the node 10a, the node 10b, and the node 10d) in the consensus network 100a may perform consensus processing on the first block needing to be written into the bifurcated blockchain (for example, the bifurcated chain 200a that supports bifurcation) based on a consensus mechanism, that is, other blockchain nodes may acquire a data reading contract associated with each transaction in the first block from a chain reading cache of respective node internal memories, so that the acquired data reading contract may be invoked to quickly obtain a write cache mapping table associated with the first block. For example, the write cache mapping tables acquired by these blockchain nodes may all be the write cache mapping table 300a shown in FIG. 2.

It is to be understood that when the blockchain node acquires the first block, a corresponding write cache may be established for the first block in the node internal memory. The write caches established for the first block may be collectively referred to as a first block cache. The first block cache may be the block cache 11 corresponding to the block hash value 11 shown in FIG. 2. The first block cache may be used for storing a transaction execution result (for example, a result 1 shown in FIG. 2) after execution of the transaction 1. Similarly, the first block cache may also be used for storing a transaction execution result (for example, a result 2 shown in FIG. 2) after execution of the transaction 2. By analogy, the first block cache may be used for storing the transaction execution result obtained after each transaction in the first block is executed.

It is to be understood that this embodiment of the disclosure provides a cache management mechanism that supports chain bifurcation, so that after the execution of the first block, the first block may be written into the bifurcation chain 200a that supports bifurcation to obtain the bifurcated chain 200b shown in FIG. 2. In this embodiment of the disclosure, a current latest block (for example, a block 11 with the largest block generation timestamp currently shown in FIG. 2) written into the bifurcated chain 200b may be collectively referred to as the first block. At the same time, as shown in FIG. 2, the blockchain node may complete selection, in advance, of the longest chain from blockchains (for example, the bifurcated chain 200b that has been successfully written into the first block) that support bifurcation in the node internal memory based on a longest chain selection policy in the consensus mechanism. In this way, the blockchain node may acquire a target block associated with the first block from the bifurcated blockchain (for example, the bifurcated chain 200b in FIG. 2) stored in the node internal memory, and the target block may be a block 5 shown in FIG. 2. In this way, when the blockchain node determines that the target block belongs to the longest chain of the bifurcated chain 200b, the target block may be written into a target blockchain 400a in FIG. 2 to obtain a target blockchain 400b containing the target block shown in FIG. 2.

It is to be understood that the write cache mapping table 300a may be used for maintaining a one-to-one correspondence relationship between the block bash value of each block and the block cache (also referred to as the write cache) of each block, and these mapping relationships are all presented in the form of Key Value (KV) pairs. For example, as shown in FIG. 2, the block hash value of each block may be used as a key in the KV pair, and the block cache of the corresponding block may be used as a value in the KV pair. For example, for a block 1 in the bifurcated chain 200b shown in FIG. 2, a mapping relationship between a block hash value of the block 1 and a block cache of the block 1 may be denoted as (block hash value 1, block cache 1); similarly, for a block 2 in the bifurcated chain 200b shown in FIG. 2, a mapping relationship between a block hash value of the block 2 and a block cache of the block 2 may be denoted as (block hash value 2, block cache 2); similarly, for a block 3 in the bifurcated chain 200b shown in FIG. 2, a mapping relationship between a block hash value of the block 3 and a block cache of the block 3 may be denoted as (block hash value 3, block cache 3); and by analogy, for the block 11 (e.g., the first block) in the bifurcated chain 200b shown in FIG. 2, a mapping relationship between a block hash value of the block 11 and a block cache of the block 11 may be denoted as (block hash value 11, block cache 11). The block hash value 11 may be the block hash value of the first block containing n transactions shown in FIG. 2, and the block cache 11 may be the first block cache storing n transaction execution results shown in FIG. 2.

Considering that each block in the bifurcated chain 200b shown in FIG. 2 stores the block hash value of a previous block, in this embodiment of the disclosure, the write caches of these blocks may be combined into a logical multi-level cache according to a hash index relationship (for example, a backward bash index relationship) of these blocks in the bifurcated chain 200b. That is, an upper-level cache of a current block is a write cache of a previous block. For example, in the bifurcated chain 200b, when a currently executed block is the block 11, an upper-level ache of the block 11 is a write cache of a block 10 in FIG. 2. Similarly, an upper-level cache of the block 10 is a write cache of a block 9 shown in FIG. 2. By analogy, an upper-level cache of the block 2 is a write cache of the block 1 shown in FIG. 2.

This means that in the write cache mapping table 300a corresponding to the bifurcated chain 200b, a logical query level of the block cache 11 mapped to the block 11 is higher than a logical query level of a block cache 10 mapped to the block 10. Similarly, the logical query level of the block cache 10 mapped to the block 10 is higher than a logical query level of a block cache 9 mapped to the block 9. By analogy, a logical query level of the block cache 2 mapped to the block 2 is higher than a logical query level of the block cache 1 mapped to the block 1.

For ease of understanding, in this embodiment of the disclosure, using the node 10c in the consensus network 100a as a blockchain node with a cache management function is taken as an example to illustrate an example of a process of implementing a data processing method in a node internal memory of the node 10c. As shown in FIG. 2, the first block may contain a plurality of transactions, and each transaction may be the transaction 1, the transaction 2, the transaction 3, . . . , and the transaction n shown in FIG. 2. As shown in FIG. 2, when performing consensus processing on the first block, the node 10c executes the transaction (for example the transaction 1 shown in FIG. 2) in the first block through the acquired data reading contract. It is to be understood that the data reading contract may be a hot-spot contract read by the node 10c from the chain reading cache in the node internal memory.

In this embodiment of the disclosure, a chain reading cache may be pre-established in the node internal memory, so as to temporarily store some commonly used chain data through the chain reading cache, for example, some frequently invoked transaction contracts, or the same contract invoking account that often initiates a contract invoking request. In the disclosure, the same contract invoking account that often initiates a contract invoking request within a target duration may be collectively referred to as a hot-spot invocation account.

It is to be understood that there is a certain transaction execution order among the n transactions packed in the block. Therefore, when performing the consensus processing on the first block, the node 10c may traverse and execute these transactions in the first block in the node internal memory to verify the reliability and authenticity of the transactions. For example, the blockchain node (for example, the node 10c) may temporarily keep the transaction execution result (e.g., the result 1 shown in FIG. 2) of the transaction 1 in the first block in the write cache of the corresponding block, so that the write cache (e.g., the first block cache shown in FIG. 2) of the current block may be adaptively used as a cache with the highest logical query level when other transactions (for example, the transaction 2) are executed in the same block. In this way, during the execution of other transactions, the blockchain node (for example, the node 10c) may quickly query target read data required for executing other transactions (for example, the transaction 2) from the write cache of the current block, and then may execute other transactions based on the queried target read data to respectively write the transaction execution results of other transactions into the write cache of the current block for saving. The transaction execution result of the transaction 2 is the result 2 shown in FIG. 2; the transaction execution result of the transaction 3 is a result 3 shown in FIG. 2; . . . ; and the transaction execution result of the transaction n is a result n shown in FIG. 2.

In this embodiment of the disclosure, accesses to a blockchain database may be greatly reduced by means of caching these transaction execution results (for example, transaction result data) in the node internal memory, so that network requests may be reduced. In this way, during execution of a certain block, the reading efficiency for the target read data required by the corresponding transaction may be improved, and the transaction execution efficiency and the block production rate may be improved, so that the throughput of the target blockchain may be further increased. For example, more target blocks belonging to the longest chain may be allowed to be written into the target blockchain.

It is to be understood that when writing a target block into the target blockchain, the blockchain node (for example, the node 10c) may also write data in a target block cache of the target block into a blockchain database corresponding to the target blockchain. The blockchain node (for example, the node 10c) may use the data in the target block cache as target chain data on the target blockchain to write the target chain data into the chain reading cache, so that it is convenient to provide a new block generated by subsequent packing with an access channel for quickly accessing a hot-spot invocation account or a hot-spot contract.

In this embodiment of the disclosure, a hash relationship table is also maintained. The hash relationship table records mapping relationships between block heights and block hash values of these blocks in the bifurcated blockchain (for example, the bifurcated chain 200b shown in FIG. 2). The bifurcated chain 200b is a bifurcated blockchain of the node internal memory that locally supports chain bifurcation. Therefore, the bifurcated chain 200b possibly has a plurality of blocks at the same block height. This means that there are possibly two or more blocks in the bifurcated chain 200b to jointly compete for the same position on the target blockchain, so that the bifurcated chain 200b has branches. In this embodiment of the disclosure, the branches in the bifurcated chain 200b may be collectively referred to as branch chains (or standby chains), for example, further including branch chains besides a main chain including the block 1, the block 2 and the block 3. The branch chains may at least include a branch chain 1a and a branch chain 1b. The blocks in the branch chain 1a may contain a block 4a, a block 5, a block 6, a branch chain 2a (a block 7b, a block 8b, a block 9, a block 10, and a block 11), and a branch chain 2b (a block 7a and a block 8a). The blocks in the branch chain 1b may contain a block 4b.

In this embodiment of the disclosure, a branch chain where a newly added block is located may be collectively referred to as a first branch chain, and other branch chains in the bifurcated blockchain may be collectively referred to as a second branch chain. For example, the branch chain 1a may be on the first branch chain as shown in FIG. 2, and the branch chain 1b may be on the second branch chain. As shown in FIG. 2, the branch chain 2a in the first branch chain 1a may be a first sub-branch chain (e.g., a new first branch chain), and the branch chain 2b in the first branch chain may be a second sub-branch chain (e.g., a new second branch chain).

The blocks in the first sub-branch chain 2a may contain the block 7b, the block 8b, the block 9, the block 10, and the block 11 shown in FIG. 2. The blocks on the second sub-branch chain 2b may include the block 7a and the block 8a shown in FIG. 2. Therefore, as shown in FIG. 2, if a newly added block (for example, the first block shown in FIG. 2) may cause a certain branch chain (for example, the branch chain 1a) to accumulate more work, this branch chain (for example, the branch chain 1*a*) will likely serve as a new main chain. In order to avoid the waste of storage resources on the chain, in this embodiment of the disclosure, the longest chain on the bifurcated blockchain may be pre-selected locally in the node internal memory, so that when it is determined that the target block belongs to the longest chain on the bifurcated blockchain, the data in the target block cache of the target block may be directly written into the blockchain database corresponding to the target blockchain, so that it may be determined that all the data written into the blockchain database belong to the data on the longest chain. In this way, data on other branch chains not belonging to the main chain on the bifurcated blockchain will not be written into the blockchain database, so that the waste of storage resources on the chain may be effectively avoided.

An example of a process of determining, by the blockchain node (for example, the node 10*c*) based on the data reading contract, the target read data associated with the transaction and acquiring the target block associated with the first block will be described with reference to the following example embodiments corresponding to FIG. 3 to FIG. 12.

Figure 3:
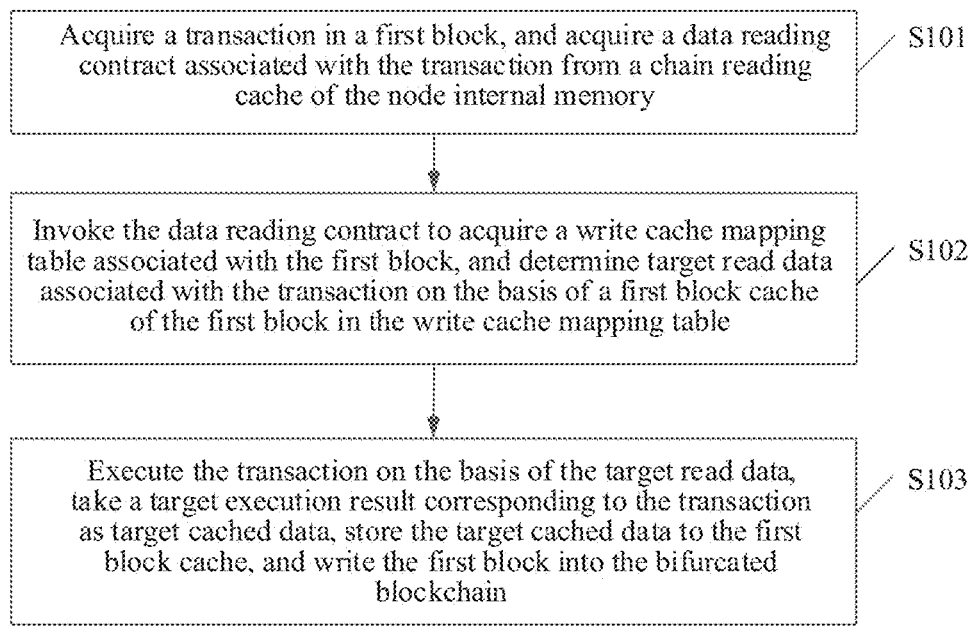
FIG. 3 is a schematic flowchart of a data processing method based on a node internal memory provided by the disclosure.

FIG. 3 is a schematic flowchart of a data processing method based on a node internal memory provided by the disclosure. As shown in FIG. 3, the method may be implemented by the blockchain node in the blockchain network. A data processing apparatus based on a node internal memory may be run in the blockchain node. The blockchain node may be any node in the consensus network 100*a* shown in FIG. 1. The method may include the following S101-S103.

S101. Acquire a transaction in a first block, and acquire a data reading contract associated with the transaction from a chain reading cache of the node internal memory.

The first block is a block to be written into a bifurcated blockchain in the node internal memory. The bifurcated blockchain may be a local blockchain that supports bifurcation. A blockchain node may perform consensus processing on the first block when acquiring the first block containing the transaction, so as to generate a transaction processing instruction used for verifying the transaction in the first block; the transaction processing instruction contains a hot-spot reading auxiliary parameter associated with the transaction; and the hot-spot reading auxiliary parameter includes: a contract invoking address used for executing a transaction contract of the transaction. The blockchain node may extract the contract invoking address from the transaction processing instruction, and search a hot-spot contract matched with a contract name mapped to the contract invoking address from the chain reading cache of the node internal memory based on the contract invoking address. The hot-spot contract may be a transaction contract which is determined in the chain reading cache and has a cumulative access frequency greater than an access threshold. The blockchain node may take the found hot-spot contract matched with the contract name as the data reading contract associated with the transaction.

For ease of understanding, the blockchain node involved in this embodiment of the disclosure may be the core node in the implementation corresponding to FIG. 1, for example: the node 10*c*. In this embodiment of the disclosure, each node (for example, a node in the consensus network 100*a*) may be configured to receive data sent from the outside during normal work, may perform block uploading processing based on the received data, and may also send data to the outside. The blockchain nodes may include, for example but not limited to: computer devices, for example, a mobile phone, a tablet computer, a notebook computer, a palmtop computer, a smart speaker, a mobile Internet device (MID), a point of sale (POS) machine, a wearable device (for example, a smart watch or a smart bracelet), and a server. The server may be, for example but not limited to, an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a CDN, big data, and an artificial intelligence platform.

Figure 4:
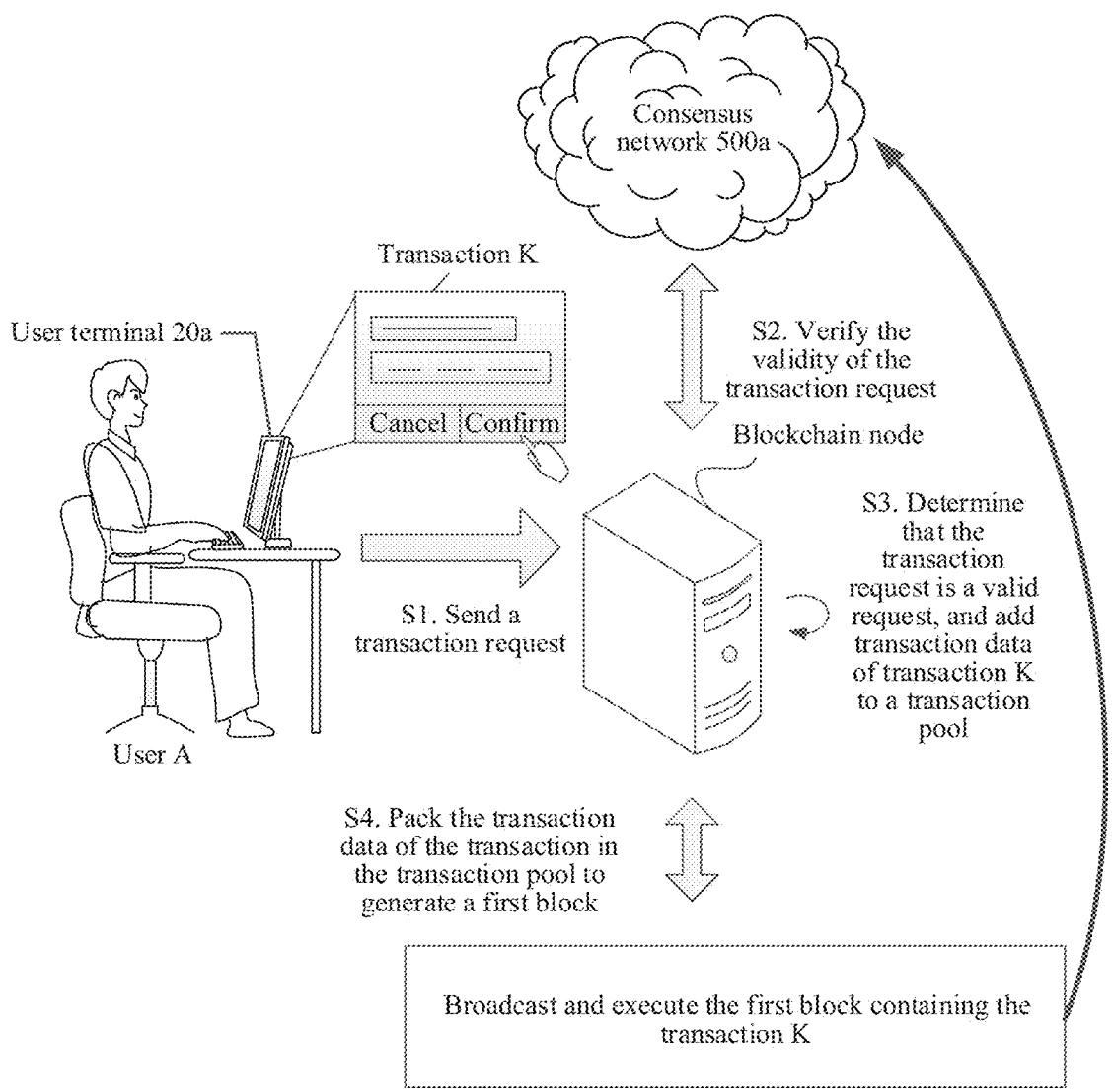
FIG. 4 is a schematic diagram of a scenario of acquiring a first block provided by an embodiment of the disclosure.

For ease of understanding, FIG. 4 is a schematic diagram of a scenario of acquiring a first block provided by an embodiment of the disclosure. The blockchain node as shown in FIG. 4 may receive a transaction request sent by a user A through a user terminal 20*a* shown in FIG. 4. As shown in FIG. 4, when the user A needs to transfer an asset to a user B (for example, the user A needs to transfer a virtual electronic resource to the user B), the user A may execute a triggering operation for a "confirm transaction" control in a transaction detail page of a transaction K shown in FIG. 4, so as to execute S1 (an operation to send a transaction request) shown in FIG. 4, and a transaction request for the transaction K may be sent to the blockchain node shown in FIG. 4. It is to be understood that the virtual electronic resource may include but not limited to the virtual assets such as an electronic bill, a credit resource, and a game currency. The transaction request may be used for instructing the blockchain node to execute S2 shown in FIG. 4, to verify the validity of the transaction request through other blockchain nodes in a consensus network 500*a* shown in FIG. 4. For example, other blockchain nodes may perform signature verification on signature information of the user A included in the transaction request, so that when the signature verification succeeds, it is determined that the user A initiating the transaction K has a permission to transfer the asset.

Next, the blockchain node may execute S3 shown in FIG. 4 to determine whether the transaction request is a valid request, and add transaction data of the transaction K to a transaction pool when it is determined that the transaction request is a valid request. That is, the transaction K requested by the user A to execute (for example, the transaction requested by the user A to transfer the virtual electronic resource to the user B) is used as a target transaction, so that the transaction data (for example, transaction detail data of the transaction K and a transaction execution result of the transaction K) after the execution of the target transaction may be added to the transaction pool; and when the blockchain node is elected to be a committer node subsequently, the blockchain node may execute S4 shown in FIG. 4: pack the transaction data corresponding to the transaction in the transaction pool to generate the first block to be written into the bifurcated blockchain. The transaction pool may include n transactions.

It is to be understood that n may be a positive integer, and the n transactions in the first block may include, but is not limited to, the transaction K shown in FIG. 4. As shown in FIG. 4, the blockchain node may also be used for broadcasting the first block containing the transaction K to the consensus network 500*a* shown in FIG. 4, so that other blockchain nodes (e.g., other core nodes) in the consensus network 500*a* may perform consensus processing on the first block to verify the validity of the transaction execution result corresponding to the transaction in the first block.

It is to be understood that when acquiring the first block, the blockchain node may pre-establish a corresponding write cache for the first block in the node internal memory of the blockchain node. In this embodiment of the disclosure, the write cache established for the first block may be collectively referred to as a first block cache. In this way, when executing the first block through a consensus layer, the blockchain node shown in FIG. 4 may directly acquire one or more transactions in the first block, and then may generate a transaction processing instruction used for verifying these transactions in the first block. The transaction processing instruction may contain a hot-spot reading auxiliary parameter associated with the transaction. The hot-spot reading auxiliary parameter may include: a contract invoking address used for executing a transaction contract of the transaction. In this way, when acquiring the contract invoking address, the blockchain node may acquire the data reading contract associated with the transaction in a chain reading cache in the node internal memory based on the contract invoking address, and may then continue to execute the following S102.

It is to be understood that the chain reading cache may be used for temporarily storing some commonly used chain data. It is to be understood that a cache management mechanism involved in this embodiment of the disclosure may include managing the chain reading cache and managing a write cache. In this embodiment of the disclosure, the chain reading cache and the write cache may be collectively referred to as a local cache. It is to be understood that by introducing the cache management mechanism in this embodiment of the disclosure, in the process of executing a certain block (for example, the first block), the subsequent data (for example, a transaction execution result of the execution of the transaction in the first block) to be written into a blockchain database is used as cached data that is temporarily written into the write cache of the currently executed block (e.g., the first block), so that in the subsequent process of executing a new first block, a brand-new multi-level cache may be achieved in the local cache through a hash chain type structure. In addition, in this embodiment of the disclosure, after the execution of the first block, the data in the write cache of a target block associated with the first block may be used as chain data that may be written into the blockchain database, and obtained latest chain data may be temporarily stored in the chain reading cache, so that the hot-spot data in the chain reading cache may be quickly accessed during the subsequent execution of the new first block.

The management of the chain reading cache may include: add chain data to the chain reading cache, use the chain data in the chain reading cache, and delete the chain data from the chain reading cache.

Figure 5:
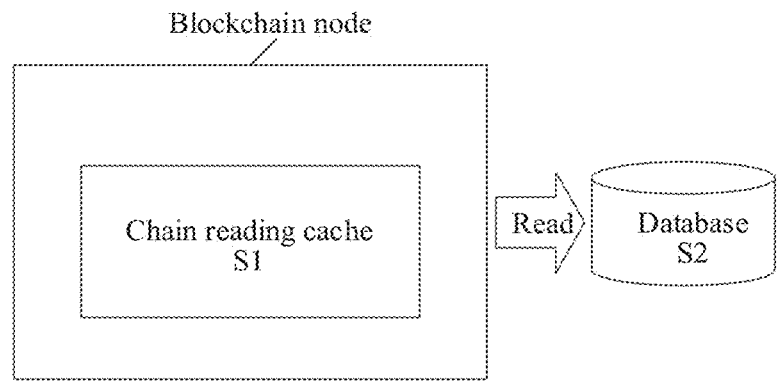
FIG. 5 is a schematic diagram of a scenario of establishing a chain reading cache in a node internal memory provided by an embodiment of the disclosure.

For example, the blockchain node may pre-establish a chain reading cache for a blockchain (for example, the target blockchain) in the node internal memory. For ease of understanding, FIG. 5 is a schematic diagram of a scenario of establishing a chain reading cache in a node internal memory provided by an embodiment of the disclosure. As shown in FIG. 5, the blockchain node may reserve a cache space in the node internal memory to establish a chain reading cache S1 shown in FIG. 5 in the cache space. It is to be understood that the chain reading cache S1 may include the above-mentioned chain reading cache. It is to be understood that the chain reading cache in the node internal memory (e.g., the chain reading cache S1 shown in FIG. 5) may be used for temporarily storing some chain data that will be frequently accessed or will be accessed again in the near future. The chain data mainly refers to data historically written into the blockchain database corresponding to the target blockchain. In this way, when a certain transaction in the block is executed, the corresponding hot-spot data (for example, the hot-spot contract that needs to be frequently accessed) may be quickly and directly found in the chain reading cache (e.g., the chain reading cache S1 shown in FIG. 5) of the node internal memory, without accessing the blockchain database directly through a network (e.g., without accessing a database S2 shown in FIG. 5 directly through a network), that is, without querying related chain data in the blockchain database, so that the data access efficiency may be effectively improved. It is to be understood that the hot-spot contract may be a transaction contract whose cumulative access frequency counted within a unit cumulative cycle of the chain reading cache (e.g., the chain reading cache S1) is greater than an access threshold. For example, the transaction contract may be the data reading contract used for reading data from the write cache (or the blockchain database) of the node internal memory.

On the other hand, it is to be understood that for the chain reading cache (e.g., the chain reading cache S1 shown in FIG. 5) in the node internal memory, in order to prevent the chain data in the chain reading cache from occupying a large internal memory space, in this embodiment of the disclosure, some chain data that is not frequently accessed also needs to be saved to the database S2 shown in FIG. 5 and may be synchronized in the chain reading cache of the node internal memory. The chain data whose cumulative access frequency is less than or equal to an access threshold is deleted to avoid waste of internal memory resources of the node internal memory.

It is to be understood that the write cache may be used for temporarily storing data changed in each transaction (that is, temporarily storing the transaction execution result of each transaction). For example, in the process that the user A transfers the virtual electronic resource (such as the game currency) to the user B, the write cache may be used for temporarily storing an account balance and the like in a user account address of the user A. It is to be understood that the management of the write cache involved may include: add a write cache to a write cache mapping table, use the write cache in the write cache mapping table, and delete data stored in the write cache in the write cache mapping table.

Figure 6:
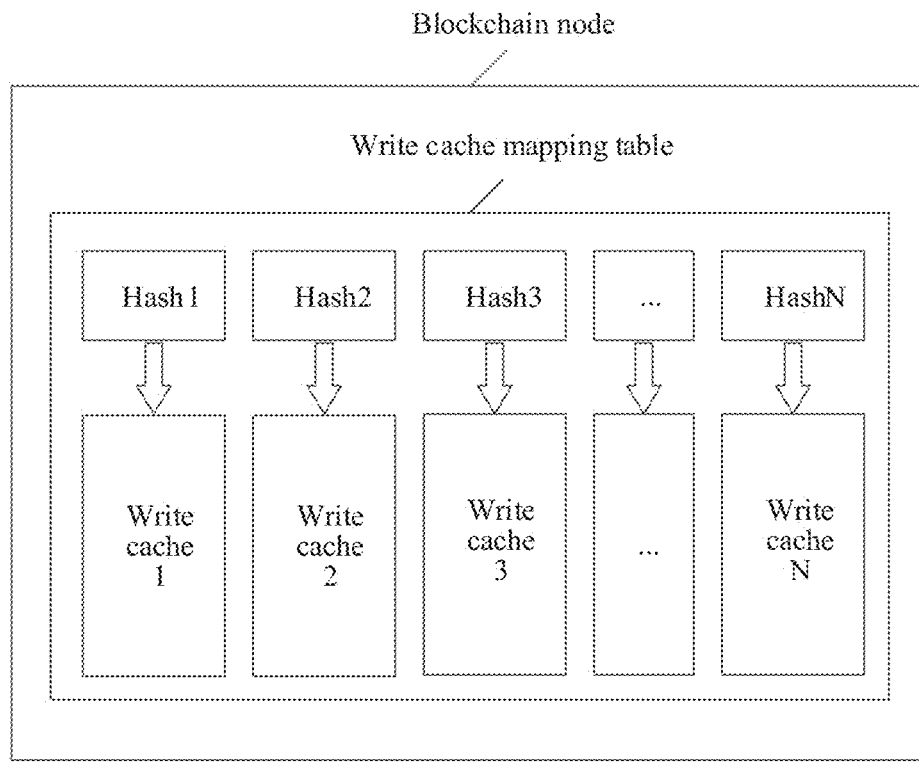
FIG. 6 is a schematic diagram of a scenario of establishing a write cache in a node internal memory provided by an embodiment of the disclosure.

For example, the blockchain node may pre-establish a write cache for each block in the node internal memory. For ease of understanding, FIG. 6 is a schematic diagram of a scenario of establishing a write cache in a node internal memory provided by an embodiment of the disclosure. The blockchain node as shown in FIG. 6 may establish a write cache for each block in the bifurcated blockchain. For ease of understanding, the write cache mapping table shown in FIG. 6 may be the write cache mapping table 300a in the embodiment corresponding to FIG. 2. This means that in the write cache mapping table shown in FIG. 6, a plurality of KV pairs may exist. For example, a hash 1 shown in FIG. 6 may be the block hash value 1 shown in FIG. 2, and a write cache 1 may be the block cache 1 shown in FIG. 2. Similarly, a hash 2 shown in FIG. 6 may be the block hash value 2 shown in FIG. 2, and a write cache 2 may be the block cache 2 shown in FIG. 2. By analogy, a hash N shown in FIG. 6 may be a block hash value N (e.g., if N is 11, the block hash value 11 shown in FIG. 2), and a write cache N may be a block cache N (e.g., the block cache 11 shown in FIG. 2). In this embodiment of the disclosure, the write cache mapping table may be dynamically maintained in the node internal memory. For example, for a block (that is, the first block) corresponding to the hash N shown in FIG. 6, the transaction execution result of the transaction in the first block may be used as cached data to be written into the write cache N shown in FIG. 6.

S102. Invoke the data reading contract to acquire a write cache mapping table associated with the first block, and determine target read data associated with the transaction based on a first block cache of the first block in the write cache mapping table.

In this embodiment of the disclosure, a logical query level of each write cache of the node internal memory is higher than a logical query level of the blockchain database. That is, when invoking the data reading contract, the blockchain node may preferentially traverse these write caches of the node internal memory according to the logical query levels to query the target read data, so that if the target read data is not found after completing the traverse of these write caches, the blockchain node may further access the blockchain database to query the target read data from the blockchain database.

Figure 7:
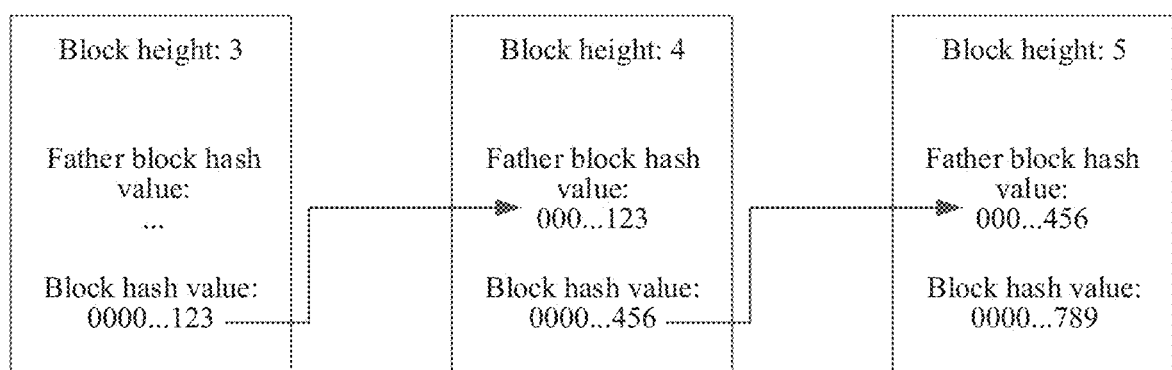
FIG. 7 is a schematic diagram of a scenario of a blockchain data structure provided by an embodiment of the disclosure.

It is to be understood that for the blocks that support bifurcation in the bifurcated blockchain, the blocks may be connected by a father block hash to form a blockchain data structure of the bifurcated blockchain. For ease of understanding, FIG. 7 is a schematic diagram of a scenario of a blockchain data structure provided by an embodiment of the disclosure. The 3 blocks shown in FIG. 7 may be some of the blocks in the bifurcated blockchain stored in the node internal memory, and the block data structures of the 3 blocks may include but are not limited to block heights, block hash values of previous blocks (e.g., father block hash values), block hash values, and the like. It is to be understood that, for a block (for example, the block 3 shown in FIG. 2) with a block height of 3 shown in FIG. 7, the block hash value (e.g., a hash character string 0000 . . . 123 shown in FIG. 7) of the block 3 may be used as the father block hash value for a next block. Similarly, for a block (for example, the block 4a shown in FIG. 2) with a block height of 4 shown in FIG. 7, the block hash value (e.g., a hash character string 0000 . . . 456 shown in FIG. 7) of the block 4a may also be used as the father block hash value for a next block. By analogy, for a block (for example, the block 5 shown in FIG. 2) with a block height of 5 shown in FIG. 7, the block hash value (e.g., a hash character string 0000 . . . 789 shown in FIG. 7) of the block 5 may also be used as the father block hash value for a next block (for example, the block 6 shown in FIG. 2). Based on this, the connection relationship between every block supporting bifurcation in the node internal memory will not be listed one by one.

Figure 8:
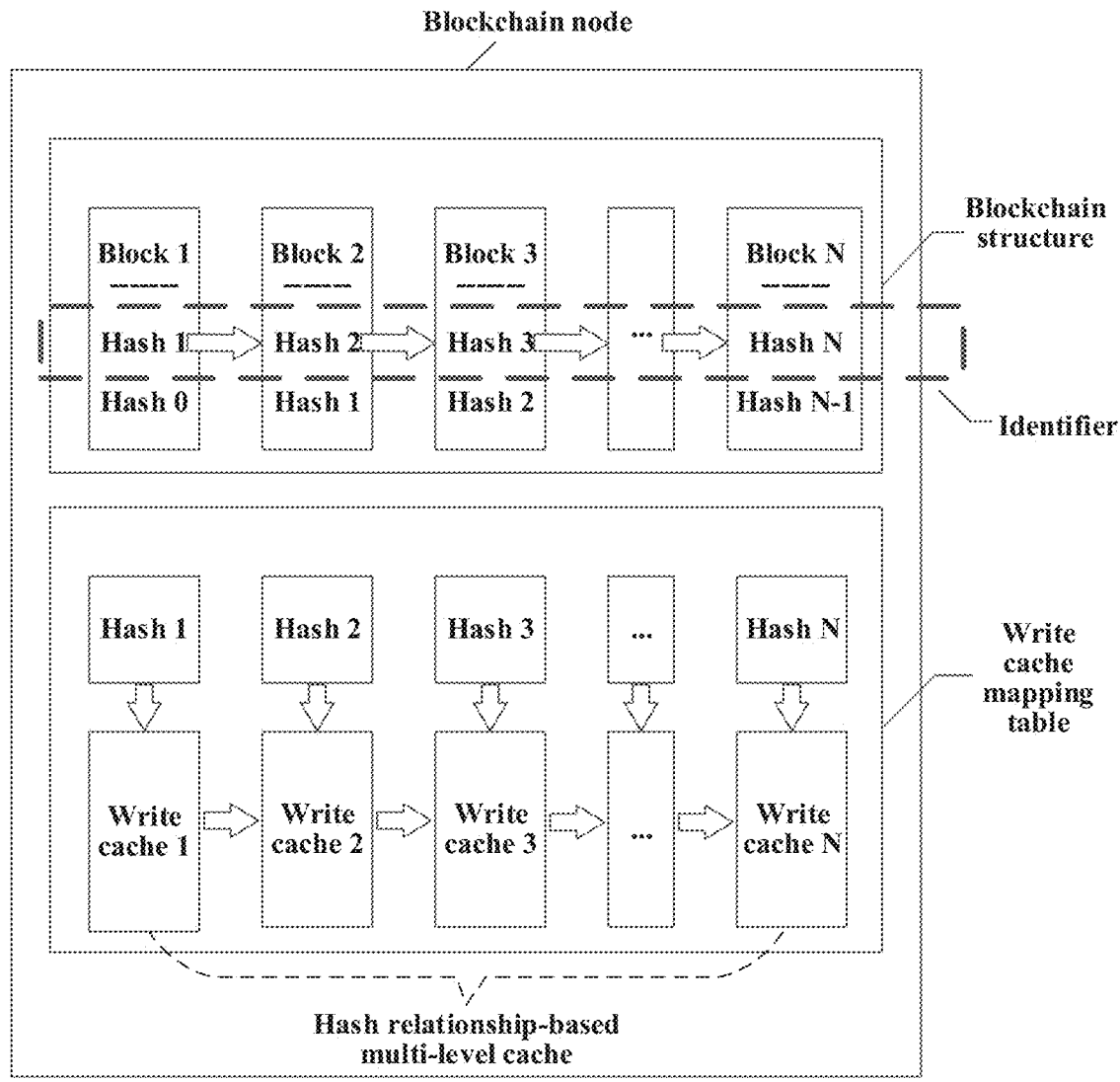
FIG. 8 is a schematic diagram of a scenario of achieving a multi-level cache based on a block chain structure provided by an embodiment of the disclosure.

It is to be understood that since the block hash value of one block may be used for uniquely identifying a specific block, and each block stores the block hash value of the previous block, in this embodiment of the disclosure, the write cache of the previous block may be quickly found through a block chain structure including the hash relationship in the blockchain data structure shown in FIG. 7 and the write cache mapping table shown in FIG. 6. In other words, in this embodiment of the disclosure, a brand-new multi-level cache may be formed by combining the write caches of the various blocks through the hash relationships in the block chain structure. For ease of understanding, FIG. 8 is a schematic diagram of a scenario of achieving a multi-level cache based on a block chain structure provided by an embodiment of the disclosure. The block chain structure shown in FIG. 8 is obtained by combining the blocks in the bifurcated blockchain in the node internal memory according to the hash relationships.

The block hash value of a block 1 shown in FIG. 8 may be a hash 1 shown in FIG. 8. The hash 1 may be used as a unique identifier of the block 1. In addition, the block hash value of the previous block of the block 1 may be a hash 0 in the block 1 shown in FIG. 8. Similarly, the block hash value of a block 2 shown in FIG. 8 may be a hash 2 shown in FIG. 8. The hash 2 may be used as a unique identifier of the block 2. In addition, the block 2 stores the block hash value of the previous block (e.g., the block 1 shown in FIG. 8), for example, the hash 1 in the block 2 shown in FIG. 8. Similarly, the block hash value of a block 3 shown in FIG. 8 may be a hash 3 shown in FIG. 8. The hash 3 may be used as a unique identifier of the block 3. In addition, the block 3 stores the block hash value of the previous block (e.g., the block 2 shown in FIG. 8), for example, the hash 2 in the block 3 shown in FIG. 8. By analogy, the block hash value of a block N shown in FIG. 8 may be a hash N shown in FIG. 8. The hash N may be used as a unique identifier of the block N. In addition, the block N stores the block hash value of the previous block (e.g., a block N-1, not shown in FIG. 8), for example, a hash N-1 in the block N shown in FIG. 8.

As shown in FIG. 8, after the blockchain node establishes the write cache for each block in the bifurcated blockchain, the blockchain node may also combine the write caches of the various blocks into a logical multi-level cache based on the hash relationships (such as hash index relationships) in the block chain structure, so that an upper-level cache of a current block is the write cache of a previous block. For example, if the first block is the block N shown in FIG. 8, the unique identifier (e.g., the hash N in the block N shown in FIG. 8) of the block N may be found in the blockchain nod, so that the write cache (for example, a write cache N in the write cache mapping table shown in FIG. 8) of the block N corresponding to the hash N may be quickly found in the write cache mapping table shown in FIG. 8, and the target read data may be queried in the write cache N. It is to be understood that if the blockchain node finds the target read data in the write cache N (e.g., the first block cache) of the block N, the following S103 may be further executed.

If the target read data is not queried in the write cache N (e.g., the first block cache), since the hash N-1 may be used for uniquely identifying the previous block (for example, the block N-1) of the block N, the blockchain node may quickly find the write cache (for example, a write cache N-1, not shown in the figure) of the block. N-1 corresponding to the hash N-1 in the write cache mapping table based on the block hash value (for example, the hash N-1 of the block N shown in FIG. 8) of the previous block stored in the block N of the block chain structure, and then may query the target read data in the write cache N-1 (e.g., a second block cache). By analogy, the blockchain node may perform backward traversing through the block chain structure to find the unique identifier of each block in the bifurcated blockchain, and then may traverse and access the write cache mapped to each block hash value in the write cache mapping table based on the unique identifier of each block. This means that in this embodiment of the disclosure, the hash relationship-based multi-level cache shown in FIG. 8 may be constructed through the hash relationships of the block chain structures shown in FIG. 8. The logical query level of the write cache (for example, the write cache N shown in FIG. 8) of the block N will be higher than the logical query level of the write cache (for example, the write cache N-1) of the block N-1. By analogy, the logical query level of the write cache (for example, a write cache 3 shown in FIG. 8) of the block 3 shown in FIG. 8 will be higher than the logical query level of the write cache (for example, a write cache 2 shown in FIG. 8) of the block 2. Similarly, the logical query level of the write cache (for example, the write cache 2 shown in FIG. 8) of the block 2 shown in FIG. 8 will be higher than the logical query level of the write cache (for example, a write cache 1 shown in FIG. 8) of the block 1.

It is to be understood that one block may include multiple transactions, and each transaction may contain transaction contracts that need to be invoked. These transaction contracts may contain a method for changing user account data, a method for reading user account data, and the like. One method may correspond to one contract function. For case of understanding, in this embodiment of the disclosure, the following is taken as an example: the transaction in the block includes a target transaction for transferring a virtual electronic resource, which is initiated by a first user (for example, Xiaohong) to a second user (for example, Xiaoming), so as to illustrate a specific process of querying the target read data (for example, the user account data in the user account address) of the target transaction in the node internal memory. At this time, the contract function in the data reading contract associated with the target transaction and acquired in S101 may be used for executing the aforementioned method for reading the user account data.

Figure 9:
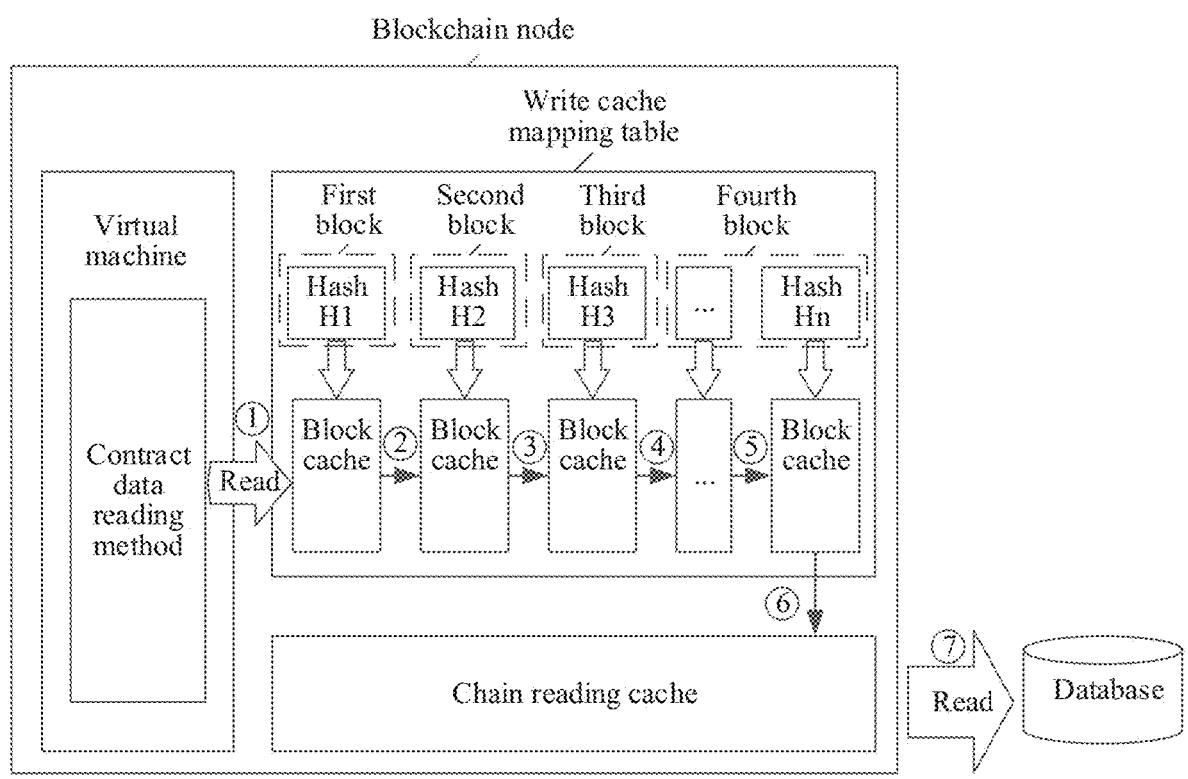
FIG. 9 is a schematic diagram of a scenario of invoking a data reading contract to read data provided by an embodiment of the disclosure.

FIG. 9 is a schematic diagram of a scenario of invoking a data reading contract to read data provided by an embodiment of the disclosure. In this embodiment of the disclosure, blocks to which the currently executed target transaction belongs may be collectively referred to as a first block. A block hash value of the first block may be a hash H1 shown in FIG. 9. In this embodiment of the disclosure, the block hash value of the first block is collectively referred to as a first block hash value. As shown in FIG. 9, when the blockchain node runs the data reading contract on a virtual machine shown in FIG. 9, a KV pair (for example, a KV pair 1) associated with the hash H1 (e.g., the first block hash value) may be pre-acquired from a write cache mapping table shown in FIG. 9 according to the multi-level cache maintained in FIG. 8, so that a block cache (e.g., the first block cache) mapped to the hash H1 (e.g., the first block hash value) may be quickly positioned according to the KV pair 1, and a historical execution result of a historical transaction that is historically written into the first block cache may be acquired in the first block cache. It is to be understood that a transaction execution order of the historical transaction positioned in the first block is earlier than a transaction execution order of the target transaction. For example, if the first user (for example, Xiaohong) has ever transferred an asset to the second user (for example, Xiaoming) (that is, transferred a virtual electronic resource), historical asset transferring records initiated by the first user to the second user by invoking a transaction contract may be collectively referred to as historical transactions. The contract function in the data reading contract may include a first execution function and a second execution function. The first execution function may be used for reading first asset data in a user account address of the first user. The second execution function may be used for reading a user account address of the second user, and the second execution function may also be used for reading second asset data in the user account address of the second user. The function performed by the second execution function will not be limited.

The blockchain node may search the historical execution result of the first block cache for the user account address of the first user (for example, Xiaohong) according to the first execution function in the data reading contract, and search the historical execution result of the first block cache for the user account address of the second user according to the second execution function in the data reading contract. If the blockchain node finds the user account address of the first user in the first block cache, the blockchain node may read the first asset data of the first user (for example, Xiaohong) from the user account address of the first user, such as a remaining asset balance after Xiaohong finished executing the previous transaction (for example, the foregoing historical transaction) (latest changed user account data of the user may be read).

It is to be understood that in order to verify the validity of the target transaction in the first block (that is, the asset transferring transaction initiated by the first user to the second user by invoking the transaction contract), in this embodiment of the disclosure, step ① in FIG. 9 also needs to be executed according to the second execution function in the data reading contract, that is, the user account address of the second user may be searched in the historical execution result of the first block cache; and if the user account address of the second user is found in the first block cache, the read first asset data and the user account address of the second user may be determined to be asset read data of the target transaction, so that the target read data associated with the transaction may be determined based on the asset read data.

As shown in FIG. 9, if the user account address of the first user is not found in the block cache (e.g., the first block cache) mapped to the hash H1 shown in FIG. 9, the blockchain node may also execute step ② in FIG. 9, that is, the blockchain node may determine a block header of the first block in the bifurcated blockchain based on the first block hash value (e.g., the hash H1 shown in FIG. 9) mapped to the first block cache, and then determine a father block hash value of the first block to be a second block hash value (for example, a hash H2 shown in FIG. 9) of a second block in the block header of the first block. The blockchain node may further acquire a KV pair (for example, a KV pair 2) associated with the hash H2 (e.g., the second block hash value) in the write cache mapping relationship table shown in FIG. 9, and then may quickly position the block cache mapped to the hash H2 (e.g., the second block hash value) according to the KV pair 2. Based on this, in this embodiment of the disclosure, the write cache mapped to the second block hash value may be used as a second block cache, so as to query the user account address of the first user in the second block cache. It is to be understood that if the user account address of the first user is found in the second block cache, the blockchain node may read the first asset data of the first user from the user account address of the first user. It is to be understood that the logical query level of the second cache block mapped to the hash H2 shown in FIG. 9 is lower than the logical query level of the first cache block mapped to the hash H1 shown in FIG. 9.

It is to be understood that if the bifurcated blockchain cached in the node internal memory of the blockchain node is a local blockchain that supports bifurcation, the local blockchain may be the bifurcated chain 200*a* in the embodiment corresponding to FIG. 2. At this time, the first block may be the block 11 in the embodiment corresponding to FIG. 2. In this embodiment of the disclosure, a branch chain to be written into the first block on the bifurcated blockchain may be collectively referred to as a first branch chain (or may be referred to as a first standby chain), and other branch chains besides the first branch chain on the bifurcated blockchain may be collectively referred to as a second branch chain (or may be referred to as a second standby chain). Therefore, as shown in FIG. 9, the first branch chain may contain a plurality of blocks shown in FIG. 9 (for example, the first block, the second block, a third block, and a fourth block). In this embodiment of the disclosure, the previous block of the second block may be referred to as the third block (e.g., the block corresponding to a hash H3 shown in FIG. 9), and a block, whose block generation timestamp is earlier than the block generation timestamp of the third block, on the first branch chain is collectively referred to as the fourth block. The write cache mapping table shown in FIG. 9 may contain a third block hash value of the third block and a fourth block hash value of the fourth block. It is to be understood that according to the above definition of the multi-level cache, the logical query level of a third block cache mapped to the third block hash value will be lower than the logical query level of the second block cache, and the logical query level of a fourth block cache mapped to the fourth block hash value will be lower than the logical query level of the third block cache.

As shown in FIG. 9, if the blockchain node does not find the user account address of the first user in the second block cache, the blockchain node may traverse and execute step ③ step ④ and step $\dot{5}$ in FIG. 9, so as to query the user account address of the first user in a traversing manner in block caches of other blocks on the first branch chain. It is to be understood that if the blockchain node neither finds the user account address of the first user in the second block cache, nor finds the user account address of the first user in both the block cache (for example, the third block cache may be the block cache mapped to the hash H3 shown in FIG. 9) of the third block shown in FIG. 9 and the block cache (for example, the fourth block cache may include but is not limited to the block cache mapped to a hash Hn shown in FIG. 9) of the fourth block shown in FIG. 9, the blockchain node may execute step ⑦ in FIG. 9, so as to query the user account address of the first user in a blockchain database corresponding to the target blockchain. If the user account address of the first user is found in the blockchain database, the first asset data of the first user may be read from the user account address of the first user.

It is to be understood that since one block includes a plurality of transactions, when the blockchain node performs consensus processing on the first block, the blockchain node may perform transaction verification on each transaction in the first block, so that when the blockchain nodes (or the consensus nodes) in the consensus network make a transaction consensus, the validity of a currently executed transaction (for example, the target transaction) may be admitted. Therefore, when these transactions in the first block all frequently invoke the same transaction contract to initiate the asset transferring transaction, the frequently invoked transaction contract may be used as a hot-spot contract to be stored to a chain reading cache shown in FIG. 9. Based on this, in the embodiments of the disclosure, contract invoking requests for asset transferring initiated frequently by a certain contract invoking account (for example, the contact invoking account corresponding to Xiaohong) may also be cumulated during the execution of the transactions of these blocks, so that the contract invoking account with a cumulative invoking frequency greater than an invoking threshold may be used as a hot-spot invoking account to store in the chain reading cache; therefore, before step ⑦ in FIG. 9 is executed, step ⑥ in FIG. 9 may be executed in the node internal memory such that the blockchain node may query the user account address of the first user in the chain reading cache of the node internal memory. In this way, accesses to the database shown in FIG. 9 may be greatly reduced. It is to be understood that the database may be the blockchain database corresponding to the target blockchain. In this embodiment of the disclosure, the hot-spot data in the chain reading cache during the execution of the transaction may be dynamically updated.

S103. Execute the transaction based on the target read data, take a target execution result corresponding to the transaction (or an execution result of the transaction) as target cached data, store the target cached data to the first block cache, and write the first block into the bifurcated blockchain.

It is to be understood that after the blockchain node completes the execution of S102, the blockchain node may further execute the current transaction (for example, the target transaction) according to the acquired target read data, and the transaction execution result of the currently executed transaction may be collectively referred to as a target execution result. In this embodiment of the disclosure, the target execution result (for example, an asset balance after an asset transferring party initiates the target transaction and an asset transferring record of the first user including transaction detail data in a transaction detail page) may be further taken as target cached data, so that the target cached data may be stored to the block cache (e.g., the first block cache) of the first block. Therefore, after the execution of all the transactions in the first block is completed, the first block is written into the bifurcated blockchain.

Since a traditional blockchain system will indiscriminately write the data in each block with a branch into the blockchain database, the blockchain jointly maintained by these miner nodes has blocks requiring version rollback. For example, if the block requiring version rollback is a block 1B, the data in the block 1B will be invalid data, which means that the existing accounting method will inevitably cause waste of a storage space on the chain.

To this end, in this embodiment of the disclosure, a target block associated with the first block may also be acquired. When it is determined in the node internal memory that the target block belongs to the longest chain on the bifurcated blockchain, the data in the target block cache of the target block is written into the blockchain database corresponding to the target blockchain.

Under normal circumstances, the blockchain node may acquire a longest chain selection policy associated with the first block, and then may screen (or select) a block that satisfies the longest chain selection policy in the bifurcated blockchain based on a block height of the first block, and take the block that satisfies the longest chain selection policy as the target block associated with the first block. The target block is a block stored in the node internal memory and historically written into the bifurcated blockchain. For example, the block generation timestamp of the target block may be earlier than the block generation timestamp of the first block. When it is determined in the node internal memory that the target block belongs to the longest chain on the bifurcated blockchain, the blockchain node may formally write the target block into the target blockchain, and may formally write the data in the target block cache of the target block into the blockchain database corresponding to the target blockchain, thus avoiding the waste of the storage resources on the chain.

In this embodiment of the disclosure, the blockchain node may also acquire the target block (e.g., the block with the block generation timestamp earlier than that of the first block) associated with the first block in the bifurcated blockchain according to the longest chain selection policy, so that it may be pre-determined in the node internal memory whether the target block belongs to the longest chain on the bifurcated blockchain. It is to be understood that if the blockchain node determines that the target block belongs to the longest chain on the bifurcated blockchain, the blockchain node may write the data in the write cache (e.g., the target block cache) corresponding to the target block into the blockchain database corresponding to the target blockchain, thereby ensuring that all the data written into the blockchain database belongs to the data on the longest chain, and ensuring the correctness of the data entered in the blockchain database to avoid the waste of storage resources on the chain as much as possible.

In this embodiment of the disclosure, by introducing the cache management mechanism, the block (e.g., the first block) executed by the blockchain node through a consensus layer is different from the target block screened according to the longest chain selection policy and written into the target blockchain. For example, the first block may be the block 11 temporarily stored on the bifurcated chain 200b in the embodiment corresponding to FIG. 2. In addition, the target block may be the block 5 that has been successfully written into the target blockchain 400b in the embodiment corresponding to FIG. 2.

The longest chain selection policy may include a first selection policy and a second selection policy. The first selection policy means that the blockchain node may compare the number of blocks on each branch chain of the bifurcated blockchain, and then may take the branch chain with the largest number of blocks as a main chain. For example, the blockchain node may take a branch chain to which the first block is newly added as the first branch chain in the bifurcated blockchain, and then may count the number of the first blocks among the blocks on the first branch chain and take the counted number of the blocks on other branch chains (e.g., the second bifurcated blockchain) in the bifurcated blockchain as the number of second blocks, so that the branch chain with the largest number of blocks may be taken as the main chain (e.g., the longest chain) in the node internal memory according to the number of first blocks corresponding to the first branch chain and the number of second blocks corresponding to the second branch chain. In this way, when acquiring the target block associated with the first block (for example, the target block may be a block having a block distance away from the block (for example, the block 11) with the largest block generation timestamp on the longest chain achieving a preset distance threshold. For example, the preset distance threshold being 6 blocks is taken as an example, and the target block may be the block 5 in the embodiment corresponding to FIG. 2. The blockchain node may further determine whether the target block is on the currently determined main chain; and if the target block is on the determined main chain, the blockchain node may allow the target block temporarily stored in the node internal memory to be written into the target blockchain, so that the blockchain database corresponding to the target blockchain may store the data in the target block cache of the target block that is currently written into the target blockchain. It is to be understood that at this time, the data in the target block cache is the chain data on the target blockchain.

The second selection policy means that the block chain node may compare the block height of the block with the largest block generation timestamp on each branch chain of the bifurcated blockchain, and then may take the branch chain with the largest block height as a main chain. For example, when there is a block bifurcation phenomenon on the bifurcated blockchain of the node internal memory, the blockchain node may also determine the block (for example, the block 11 shown in FIG. 2) with the largest block generation timestamp in the first branch chain according to the second selection policy, and may determine the block height of the block (for example, the block 4b shown in FIG. 2) with the largest block generation timestamp in the second branch chain. Based on this, the first branch chain may be taken as an initial main chain. Similarly, the first branch chain has a first sub-branch chain and a second sub-branch chain, so that the blockchain node may also compare the block height of the block (for example, the block 11 shown in FIG. 2) with the largest block generation timestamp in the first branch chain with the block height of the block (for example, the block 8a shown in FIG. 2) with the largest block generation timestamp in the second branch chain, and then a hash chain including the blocks on the initial main chain and the blocks on the first sub-branch chain may be collectively referred to as the main chain (e.g., the longest chain); and a block with the block height satisfying a height threshold (for example, 6) relative to the first block is found on the longest chain as the target block to determine whether the target block is on the longest chain.

By means of introducing the write cache mapping table (e.g., a cache management mechanism that supports bifurcation) in this embodiment of the disclosure, in a consensus confirmation process for the first block, the transaction execution results of the transactions in the first block that are temporarily not determined to belong to the longest chain are taken as target cached data to be temporarily stored to the first block cache. In this way, after completing the consensus confirmation of the first block, the blockchain node may allow the first block to be written into a bifurcated blockchain (which refers to a local blockchain that may support the bifurcation in the node internal memory here) in the node internal memory, so that a branch-new multi-level cache may be constituted in the node internal memory through hash values of these stored blocks, which may improve the data reading efficiency in the write caches of these blocks. In addition, the blockchain node may also acquire the target block (e.g., the block with the block generation timestamp earlier than that of the first block) associated with the first block in the bifurcated blockchain according to the longest chain selection policy, so that it may be pre-determined in the node internal memory whether the target block belongs to the longest chain on the bifurcated blockchain. It is to be understood that if the blockchain node determines that the target block belongs to the longest chain on the bifurcated blockchain, the blockchain node may access the data in the write cache (e.g., the target block cache) corresponding to the target block into the blockchain database corresponding to the target blockchain, thereby ensuring that all the data written into the blockchain database belongs to the data on the longest chain, and ensuring the correctness of the data entered in the blockchain database to avoid the waste of storage resources on the chain as much as possible.

Figure 10:
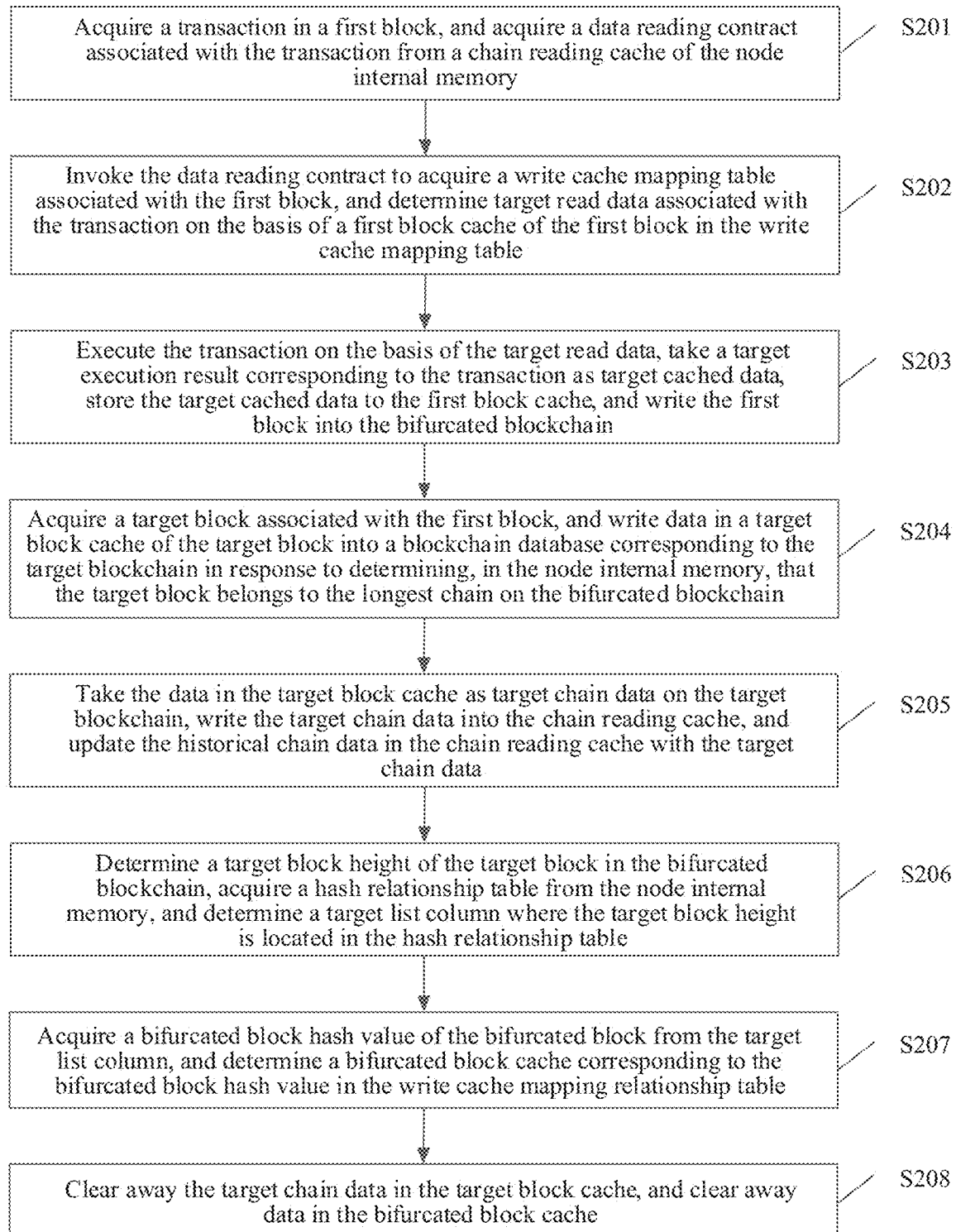
FIG. 10 is a schematic flowchart of a data processing method based on a node internal memory provided by an embodiment of the disclosure.

FIG. 10 is a schematic flowchart of a data processing method based on a node internal memory provided by an embodiment of the disclosure. As shown in FIG. 10, the method may be implemented by a blockchain node. The blockchain node may be any blockchain node (for example, the node 10c) in the consensus network 100a shown in FIG. 1. The method may include the following steps S201 to S208:

S201. Acquire a transaction in a first block, and acquire a data reading contract associated with the transaction from a chain reading cache of the node internal memory.

The first block is a block to be written into a bifurcated blockchain in the node internal memory.

S202. Invoke the data reading contract to acquire a write cache mapping table associated with the first block, and determine target read data associated with the transaction based on a first block cache of the first block in the write cache mapping table.

S203. Execute the transaction based on the target read data, take a target execution result corresponding to the transaction as target cached data, store the target cached data to the first block cache, and write the first block into the bifurcated blockchain.

S204. Acquire a target block associated with the first block, and write data in a target block cache of the target block into a blockchain database corresponding to the target blockchain in response to determining, in the node internal memory, that the target block belongs to the longest chain on the bifurcated blockchain.

A block generation timestamp of the target block is earlier than a block generation timestamp of the first block. The blockchain node may acquire a longest chain selection policy associated with the first block, screen a block that satisfies the longest chain selection policy in the bifurcated blockchain based on a block height of the first block, and take the block that satisfies the longest chain selection policy as the target block associated with the first block, the target block being a block cached in the node internal memory and historically written into the bifurcated blockchain. The blockchain node may write the target block into the target blockchain in response to determining, in the node internal memory, that the target block belongs to the longest chain on the bifurcated blockchain, and write data in the target block cache of the target block into the blockchain database corresponding to the target blockchain.

The chain reading cache may include: the hot-spot data and historical chain data. The historical chain data may include data that is successfully written into a historical block cache of the target blockchain at a historical time. The historical block cache is a write cache of a historical block in the bifurcated blockchain, and a block generation timestamp of the historical block is earlier than a block generation timestamp of the target block. Therefore, after the blockchain node finishes executing S204, S205 may also be executed.

S205. Take the data in the target block cache as target chain data on the target blockchain, write the target chain data into the chain reading cache, and update the historical chain data in the chain reading cache with the target chain data.

For example, the blockchain node may take the data in the target block cache as the target chain data on the target blockchain, and then may write the target chain data into the chain reading cache at a current time T2 (T2 is after T1). It is to be understood that the chain reading cache contains data (e.g., the historical chain data) written into other block caches (e.g., historical block caches) of the chain reading cache at the historical time (e.g., a time before T1). Therefore, when the target chain data is written into the chain reading cache, the historical chain data may be dynamically updated in the chain reading cache (that is, the target chain data may be used as new historical chain data), so that a quick historical chain data access may be provided for a recently generated new first block in the chain reading cache when the new first block is subsequently generated by packing. For another example, the chain reading cache may also be used for storing hot-spot data such as transaction contracts that are frequently invoked (e.g., the hot-pot contracts) and hot-spot invoking accounts that often invoke and initiate a contract invoking request in a process that the blockchain node executes these transactions of a certain block.

Figure 11:
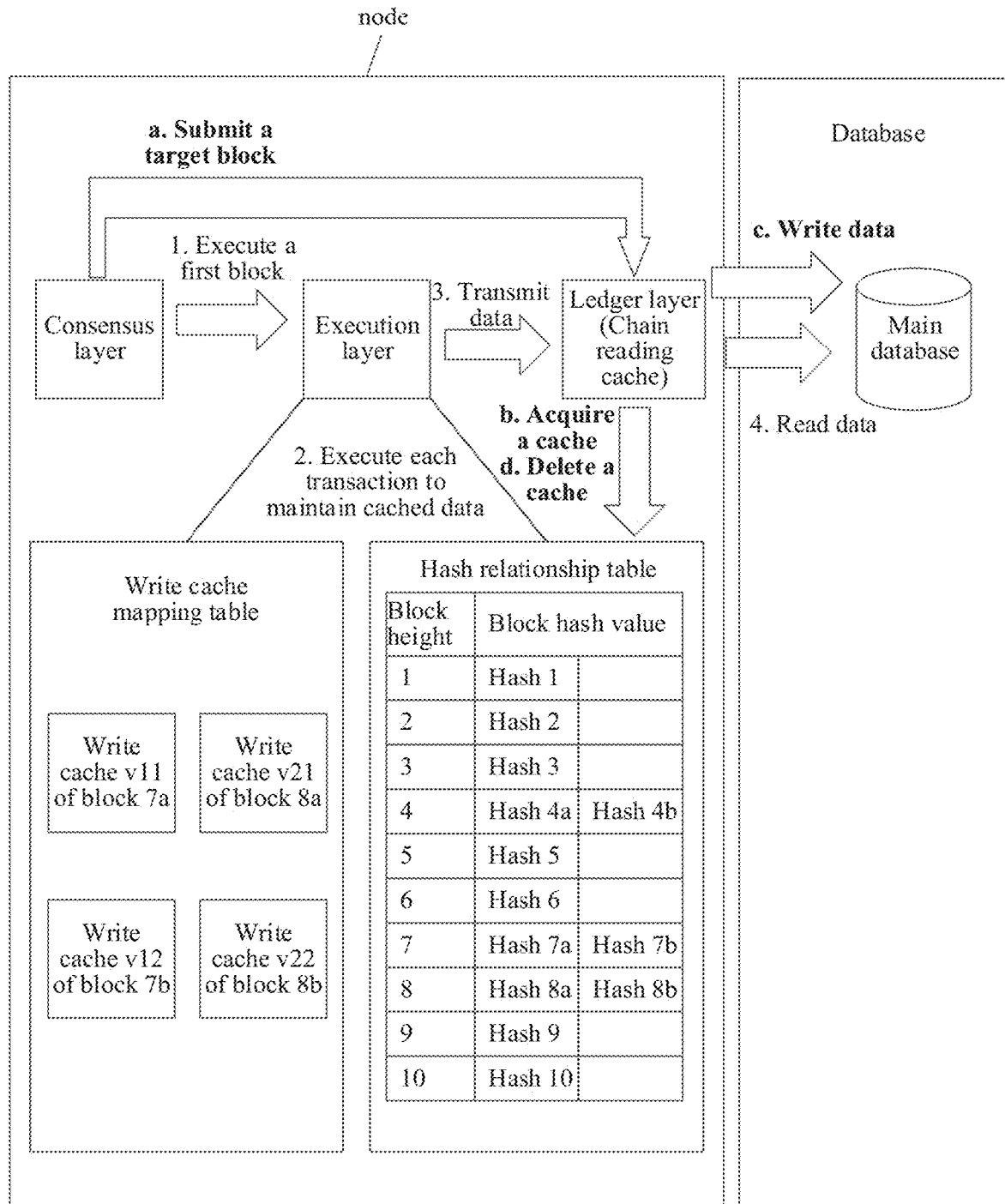
FIG. 11 is a schematic diagram of a scenario of submitting a target block provided by an embodiment of the disclosure.

For ease of understanding, FIG. 11 is a schematic diagram of a scenario of submitting a target block provided by an embodiment of the disclosure. As shown in FIG. 11, when performing step 1 through a consensus layer shown in FIG. 11, the blockchain node may perform consensus processing on a currently packed block (e.g., the first block, which may be the block shown in FIG. 11), and then may perform transaction verification on a transaction (transaction for short) in the first block. At this time, when performing step 2 through an execution layer shown in FIG. 11, the blockchain node executes each transaction in the first block, and then may write a respective transaction execution result into the first block cache when the transaction verification succeeds, so as to maintain cached data in a first block cache of the node internal memory. It is to be understood that after completing the transaction consensus processing on the transaction in the first block, the blockchain node may complete the consensus processing on the first block, and then may write the first block into a bifurcated blockchain (e.g., a bifurcated chain that locally supports bifurcations) of the node internal memory, so as to obtain the bifurcated chain 200a shown in FIG. 2.

It is to be understood that in the process of executing the transaction of the first block, the blockchain node may execute step 3 shown in FIG. 11, that is, the blockchain node may acquire a hot-spot reading auxiliary parameter associated with the transaction, and may send a transaction processing instruction containing the hot-spot reading auxiliary parameter to a ledger layer shown in FIG. 11, so as to acquire a transaction contract used for executing the transaction from the chain reading cache of the ledger layer based on a contract invoking address in the hot-spot reading auxiliary parameter; and the transaction contract acquired in the chain reading cache may be collectively referred to as the data reading contract. As shown in FIG. 11, if the blockchain node does not acquire the data reading contract associated with the transaction in the chain reading cache, the blockchain node may execute step 4 shown in FIG. 11, and may acquire the data reading contract associated with the transaction in a database (for example, a main database corresponding to the target blockchain shown in FIG. 11) associated with the blockchain node, so that target read data used for verifying the transaction may be read through the acquired data reading contract, and the transaction may be executed based on the target read data; and a transaction execution result of the transaction may be written into a first block cache corresponding to the first block to dynamically maintain the cached data in the first block cache in a write cache mapping table shown in FIG. 11.

It is to be understood that since a block may contain a large amount of transactions, the execution of these transactions may be in accordance with a transaction execution order. Therefore, in the process of executing these transactions in the first block, the blockchain node may also cumulate transaction contracts frequently invoked in the process of executing these transactions or contract invoking accounts that frequently initiate contract invocation, and then may take the frequently invoked transaction contracts and the contract invoking accounts as hot-spot data, so as to dynamically update the hot-spot data in the chain reading cache in the ledger layer shown in FIG. 11.

It is to be understood that when the consensus layer shown in FIG. 11 writes the first block (for example, a block with a block height of 10 shown in FIG. 11) into the bifurcated blockchain to obtain the bifurcated chain 200*a*, the consensus layer in the blockchain node may also select a block that has been historically executed and satisfies the longest chain selection policy on the bifurcated chain 200*a* based on the longest chain selection policy to be used as the target block associated with the first block, and then may execute step a shown in FIG. 11. When the target block is submitted to the target blockchain in step a, step c shown in FIG. 11 may be further executed, that is, the data in the target block cache corresponding to the target block is written into the main database shown in FIG. 11.

In addition, it is to be understood that the blockchain node may also write the data in the target block cache of the target block into the ledger layer shown in FIG. 11, so as to facilitate the dynamic updating of the historical chain data in the chain reading cache.

In this embodiment of the disclosure, a cache management mechanism that supports bifurcation may be provided, so that when the execution of the currently packed block (e.g., the first block) is completed, selection of the longest chain on the bifurcated blockchain that supports bifurcation is completed in the node internal memory, thus determining a block (e.g., the target block) that may be currently submitted to the target blockchain. Then, the blockchain node may take the data in the target block cache of the currently submitted target block as the target chain data and write it into the chain reading cache shown in FIG. 11, and may also perform step b shown in FIG. 11. That is, the target block cache of the target block may be acquired, and step d shown in FIG. 11 may be further executed, so that the data in the target block cache of the target block may be deleted in the node internal memory.

It is to be understood that as shown in FIG. 11, the blockchain node may maintain a hash relationship table in the node internal memory, and a block height of the currently submitted target block may be determined through the hash relationship table, so that all blocks (e.g., all bifurcated blocks) with the same block height as that of the target block may be found in the hash relationship table. In other words, it is to be understood that if a bifurcated block with the same block height as that of the target block exists on the bifurcated blockchain, the blockchain node may further execute the following S206.

S206: Determine a target block height of the target block in the bifurcated blockchain, acquire a hash relationship table from the node internal memory, and determine a target list column where the target block height is located in the hash relationship table.

S207. Acquire a bifurcated block hash value of the bifurcated block from the target list column, and determine a bifurcated block cache corresponding to the bifurcated block hash value in the write cache mapping relationship table.

S208. Clear away the target chain data in the target block cache, and clear away data in the bifurcated block cache.

Figure 12:
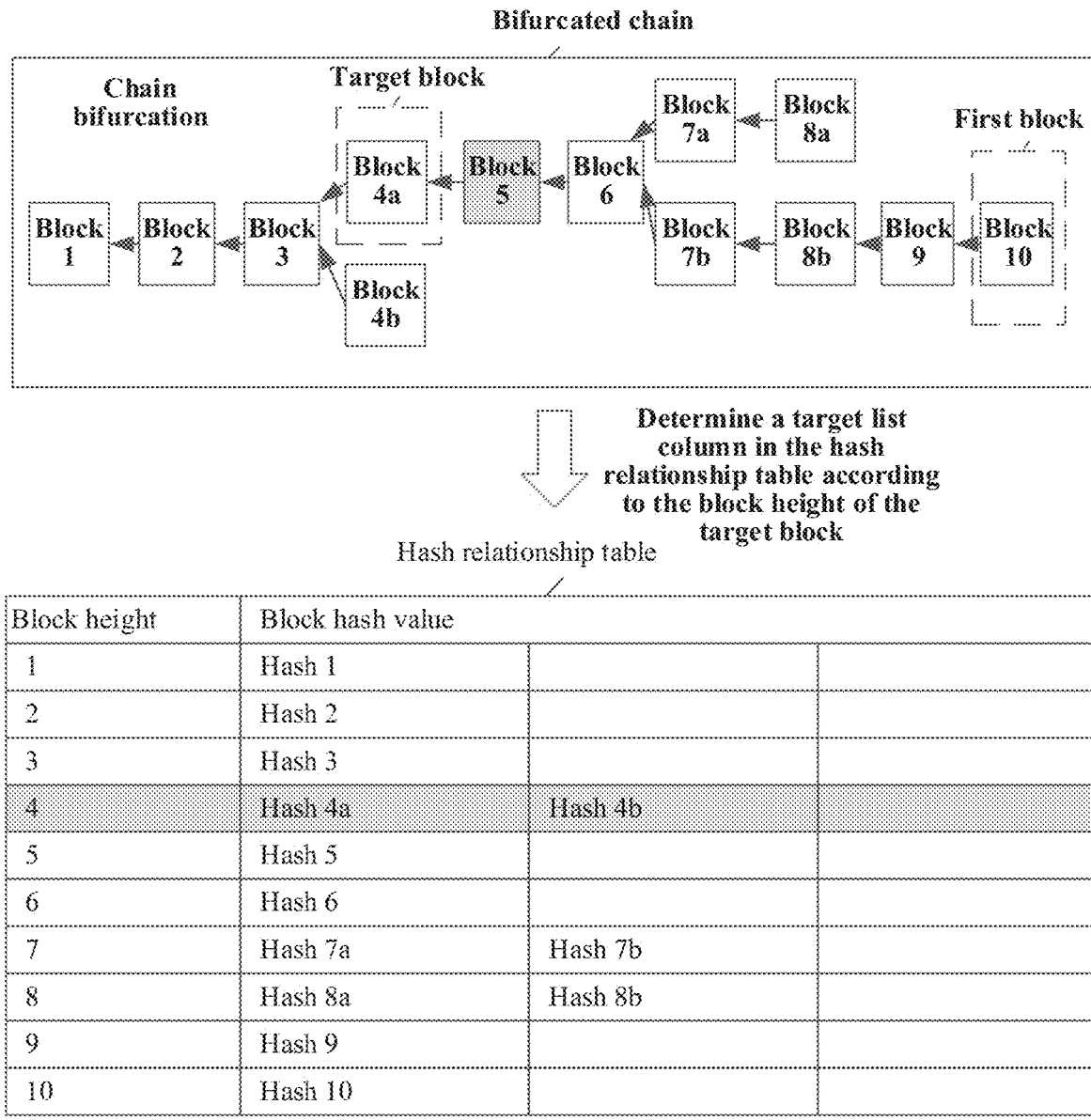
FIG. 12 is a schematic diagram of a scenario of deleting data provided by an embodiment of the disclosure.

For ease of understanding, FIG. 12 is a schematic diagram of a scenario of deleting data provided by an embodiment of the disclosure. As shown in FIG. 12, considering that a bifurcated blockchain (a bifurcated chain shown in FIG. 12) in the node internal memory may have the characteristics of block bifurcation, the blockchain node may maintain a hash mapping table (e.g., a hash relationship table shown in FIG. 12) when the bifurcated chain of the node internal memory supports the bifurcation characteristics. For example, the hash mapping table shown in FIG. 12 includes all blocks in the bifurcated chain according to block heights and block hash values. In the hash mapping table, the number of blocks with the same block heights may be one or multiple. For example, in the bifurcated chain shown in FIG. 12, the blockchain node may acquire a target block associated with a first block (for example, a block with a block height difference of 6 with the first block shown in FIG. 12 may be selected as the target block based on the longest chain selection policy), and then may write data in a target block cache of the target block (for example, the block 4*a* shown in FIG. 12) into a blockchain database corresponding to a target blockchain when determining that the block 4*a* (e.g., the target block) shown in FIG. 12 belongs to the longest chain of the bifurcated blockchain. The blockchain database may be the main database shown in FIG. 11.

In addition, in this embodiment of the disclosure, after the data in the target block cache is written into the blockchain database corresponding to the target blockchain, in order to improve the data reading efficiency, the data in the target block cache may also be used as target chain data to be written into a chain reading cache. In this way, the target read data may be quickly found directly in the node internal memory without querying the blockchain database through a network.

Finally, since the carrier capacity of the node internal memory is limited, in this embodiment of the disclosure, the target chain data in the target block cache may also be deleted in the node internal memory. In an embodiment, the blockchain node may determine a block position of the currently submitted target block in the bifurcated chain shown in FIG. 12, that is, the block position of the target block may be a target block height of the target block. For example, the target block height of the block 4*a* (e.g., the target block) shown in FIG. 12 may be "4" in the hash relationship table shown in FIG. 12, so that a list column where the target block height is "4" in the hash relationship table may be taken as the target list column. As shown in FIG. 12, the blockchain node may determine a block hash value associated with the target block height in the target list column. For example, the block hash value with the target block height of "4" may include a block hash value of the block 4*a* (for example, a hash 4*a*) and a block hash value of the block 4*b* (for example, a hash 4*b*) in FIG. 12. It is to be understood that the block 4*a* is the bifurcated block that exists on the bifurcated blockchain (e.g., the bifurcated chain shown in FIG. 12) and has the same block height as that of the target block. Therefore, since the data in the bifurcated block will not be recorded in the blockchain database, in order to avoid waste of internal memory resources in the node internal memory, the blockchain node may also acquire a bifurcated block hash value (e.g., the hash 4*b* shown in FIG. 12) of the bifurcated block in the target list column. In this way, the blockchain node may quickly determine a bifurcated block cache corresponding to the bifurcated block hash value in the write cache mapping relationship table. Therefore, when the blockchain node needs to delete the write cache corresponding to the block hash value in the target list column from the write cache mapping table, the blockchain node may clear away the data in the bifurcated block cache (e.g., the write cache corresponding to the block 4*b*) while clearing away the target chain data in the target block cache (the write cache corresponding to the block 4*a*), so that the effective utilization rate of the node internal memory may be improved.

In this embodiment of the disclosure, when it is determined in the node internal memory that the first block belongs to the longest chain on the bifurcated blockchain, the blockchain node may also write the target cached data in the first block cache into the blockchain database corresponding to the target blockchain.

For example, if the number of transactions in the first node is multiple, for example, if any two adjacent transactions in the first node may include a first transaction and a second transaction, the target cached data may include first cached data corresponding to the first transaction and second cached data corresponding to the second transaction. The second transaction may be a previous transaction of the first transaction. For example, the first transaction may be the target transaction, and the second transaction may be the historical transaction. At this time, the blockchain node may write the second cached data in the first block cache into the blockchain database while writing the first cached data in the first block cache into the blockchain database corresponding to the target blockchain.

In other words, in this embodiment of the disclosure, the blockchain node may also allow all the data (e.g., the foregoing first cached data and second cached data) in the first block cache of the first block to be written into the blockchain database based on the longest chain selection policy when subsequently determining that the first block also belongs to the longest chain on the bifurcated blockchain.

It is to be understood that due to limited internal memory resources of a local internal memory of the blockchain node, in order to ensure that the blockchain node may provide adaptive internal memory computing resources, in this embodiment of the disclosure, the cache capacity of the node internal memory may also be dynamically monitored; and when it is monitored that the cache capacity of the node internal memory reaches a cache threshold, blocks (e.g., some blocks that are cached in the bifurcated blockchain and have earlier generation timestamps) that satisfy a cache duration condition in the bifurcated blockchain are determined to be blocks to be destroyed. In this way, the blockchain node may perform block destruction processing on the blocks to be destroyed in the bifurcated blockchain, so as to effectively manage and utilize the internal memory resources of the node internal memory.

In this embodiment of the disclosure, by means of the provided cache management mechanism that supports bifurcation, after the transaction execution result of the transaction of a currently executed certain block (e.g., the first block) is written into the first block cache, the first block may be temporarily stored on the bifurcated blockchain of the node internal memory. For example, in this embodiment of the disclosure, a block hash value of a previous block (for example, the second block) may be positioned on the bifurcated blockchain according to a father block hash value in a block header of the first block, so that the first block may be added to a branch chain where the second block on the bifurcated blockchain is located. It is to be understood that the bifurcated blockchain may be a local blockchain that supports the bifurcation characteristic in the node internal memory. Based on this, in this embodiment of the disclosure, a hash relationship table for associating block heights with block hash values may also be dynamically maintained in real time in the node internal memory. Other blocks with the same block height as that of the currently submitted target block may be quickly found through the hash relationship table, and the found blocks and blocks have the same block height as that of the currently submitted target block in the node internal memory may be collectively referred to as a bifurcated block. In this way, when clearing away the uploaded data in the write cache (e.g., the target block cache) of the target block in the node internal memory, the blockchain node may also clear away the data in the write caches (e.g., the bifurcated block cache) of all the bifurcated blocks in the node internal memory, so that it may ensure that the data written into the target blockchain all belong to the data of the longest chain, and the waste of storage resources on the chain may be avoided. Obviously, in this embodiment of the disclosure, by introducing the cache management mechanism that supports bifurcation, the internal memory resources of the node internal memory may be effectively utilized, thereby reducing the access load to the blockchain database; and the data access efficiency may be improved in the node internal memory. In addition, it is to be understood that the target blockchain involved in this embodiment of the disclosure will not have a block bifurcation phenomenon, which means that the blockchain node does not need to perform version rollback on the target blockchain, so that it is not necessary to maintain a complicated blockchain bifurcation state on the target blockchain.

Figure 13:
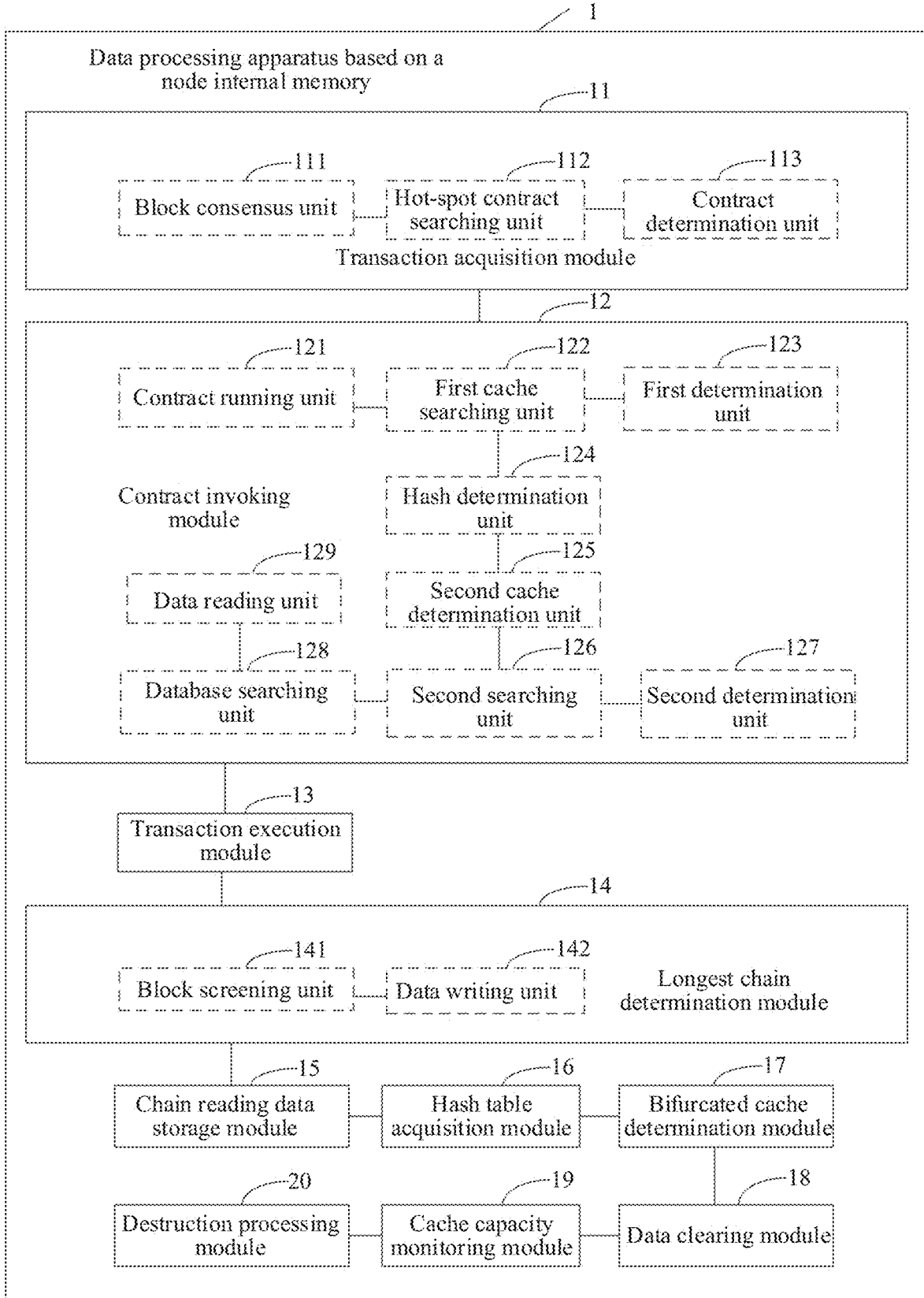
FIG. 13 is a schematic structural diagram of a data processing apparatus based on a node internal memory provided by the disclosure.

FIG. 13 is a schematic structural diagram of a data processing apparatus based on a node internal memory provided by the disclosure. As shown in FIG. 13, a data processing apparatus 1 based on a node internal memory may be applied to any blockchain node in the consensus network. For example, the data processing apparatus 1 may be applied to the node 10c in the embodiment corresponding to FIG. 1. As shown in FIG. 13, the data processing apparatus 1 based on the node internal memory may include: a transaction acquisition module 11, a contract invoking module 12, and a transaction execution module 13; and may further include a longest chain determination module 14. The data processing apparatus 1 based on the node internal memory may further include: a chain reading data storage module 15, a hash table acquisition module 16, a bifurcated cache determination module 17, a data clearing module 18, a cache capacity monitoring module 19, and a destruction processing module 20.

The transaction acquisition module 11 is configured to acquire a transaction in a first block, and acquire a data reading contract associated with the transaction from a chain reading cache of the node internal memory; and the first block is a block to be written into a bifurcated blockchain in the node internal memory.

The transaction acquisition module 11 includes: a block consensus unit 111, a hot-spot contract searching unit 112, and a contract determination unit 113.

The block consensus unit 111 is configured to acquire the first block containing the transaction, and generate a transaction processing instruction used for verifying the transaction in the first block when performing consensus processing on the first block; the transaction processing instruction contains a hot-spot reading auxiliary parameter associated with the transaction; and the hot-spot reading auxiliary parameter includes: a contract invoking address used for executing a transaction contract of the transaction.

The hot-spot contract searching unit 112 is configured to extract the contract invoking address from the transaction processing instruction, and search a hot-spot contract matched with a contract name mapped to the contract invoking address from the chain reading cache of the node internal memory based on the contract invoking address; and the hot-spot contract is a transaction contract which is determined in the chain reading cache and has a cumulative access frequency greater than an access threshold.

The contract determination unit 113 is configured to take the found hot-spot contract matched with the contract name as the data reading contract associated with the transaction.

For the specific implementation of the block consensus unit 111, the hot-spot contract searching unit 112, the contract determination unit 113, reference may be made to the description about S101 in the embodiment corresponding to FIG. 3, and details are not described herein again.

The transaction acquisition module 11 is further configured to acquire the data reading contract from a blockchain database associated with the node internal memory in a case that the data reading contract associated with the transaction is not acquired in the chain reading cache.

The contract invoking module 12 is configured to invoke the data reading contract to acquire a write cache mapping table associated with the first block, and determine target read data associated with the transaction based on a first block cache of the first block in the write cache mapping table.

The transaction includes: a target transaction for asset transferring initiated from a first user to a second user; a contract function in the data reading contract includes a first execution function and a second execution function; the first execution function is used for reading first asset data in a user account address of the first user; and the second execution function is used for reading a user account address of the second user.

The contract invoking module 12 includes: a contract running unit 121, a first cache searching unit 122, and a first determination unit 123. The contract invoking module 12 further includes: a hash determination unit 124, a second cache determination unit 125, a second searching unit 126, a second determination unit 127, a database searching unit 128, and a data reading unit 129.

The contract running unit 121 is configured to acquire the write cache mapping table associated with the first block in a case that the data reading contract is run in a virtual machine, take a write cache mapped to a first block hash value of the first block as the first block cache in the write cache mapping table, and acquire a historical execution result of a historical transaction stored in the first block cache, a transaction execution order of the historical transaction being earlier than a transaction execution order of the target transaction.

The first cache searching unit 122 is configured to search the historical execution result of the first block cache for the user account address of the first user according to the first execution function in the data reading contract, and search the historical execution result of the first block cache for the user account address of the second user according to the second execution function in the data reading contract.

The first determination unit 123 is configured to read the first asset data of the first user from the user account address of the first user in a case that the user account address of the first user is found in the first block cache.

The first determination unit 123 is further configured to determine the read first asset data and the user account address of the second user to be asset reading data of the target transaction in a case that the user account address of the second user is found in the first block cache, and determine the target read data associated with the transaction based on the asset reading data.

For the specific implementation of the contract running unit 121, the first cache searching unit 122, the first determination unit 123, reference may be made to the description about S102 in the embodiment corresponding to FIG. 3, and details are not described herein again.

The bifurcated blockchain contains a second block; the second block is a previous block of the first block; and the write cache mapping table contains a second block hash value of the second block.

The hash determination unit 124 is configured to determine a block header of the first block in the bifurcated blockchain based on the first block hash value mapped to the first block cache in a case that the user account address of the first user is not found in the first block cache, and take a father block hash value of the first block as the second block hash value of the second block in the block header of the first block.

The second cache determination unit 125 is configured to take the write cache mapped to the second block hash value as a second block cache in the write cache mapping relationship table; and a logical query level of the second block cache is lower than a logical query level of the first block cache.

The second searching unit 126 is configured to query the user account address of the first user in the second block cache.

The second determination unit 127 is configured to read the first asset data of the first user from the user account address of the first user in a case that the user account address of the first user is queried in the second block cache.

The bifurcated blockchain contains a first branch chain. In a case that the first branch chain contains a third block and a fourth block, the third block is a previous block of the second block, and a block generation timestamp of the fourth block is earlier than a block generation timestamp of the third block; the write cache mapping table contains a third block hash value of the third block and a fourth block hash value of the fourth block; and a logical query level of a third block cache mapped to the third block hash value is lower than the logical query level of the second block cache, and a logical query level of a fourth block cache mapped to the fourth block hash value is lower than the logical query level of the third block cache.

The database searching unit 128 is configured to query the user account address of the first user in a blockchain database corresponding to the target blockchain in a case that the user account address of the first user is not found in the second block cache and that the user account address of the first user is not found in both the third block cache and the fourth block cache.

The data reading unit 129 is configured to read the first asset data of the first user from the user account address of the first user in a case that the user account address of the first user is queried in the blockchain database.

The specific implementations of the hash determination unit 124, the second cache determination unit 125, the second searching unit 126, the second determination unit 127, the database searching unit 128, and the data reading unit 129 may refer to the descriptions of the specific process of querying the multi-level cache based on hash relationships in the embodiment corresponding to FIG. 3, and will not repeatedly described here.

The transaction execution module 13 is configured to execute the transaction based on the target read data, take a target execution result corresponding to the transaction as target cached data, store the target cached data to the first block cache, and write the first block into the bifurcated blockchain.

The data processing apparatus 1 based on the node internal memory may further include the longest chain determination module 14.

The longest chain determination module 14 is configured to acquire a target block associated with the first block, and write data in a target block cache of the target block into a blockchain database corresponding to the target blockchain in response to determining, in the node internal memory, that the target block belongs to the longest chain on the bifurcated blockchain; and a block generation timestamp of the target block is greater than the block generation timestamp of the first block.

The longest chain determination module 14 includes: a block screening unit 141 and a data writing unit 142.

The block screening unit 141 is configured to acquire a longest chain selection policy associated with the first block, screen a block that satisfies the longest chain selection policy in the bifurcated blockchain based on a block height of the first block, and take the block that satisfies the longest chain selection policy as the target block associated with the first block; and the target block is a block cached in the node internal memory and historically written into the bifurcated blockchain.

The data writing unit 142 is configured to write the target block into the target blockchain in response to determining, in the node internal memory, that the target block belongs to the longest chain on the bifurcated blockchain, and write data in the target block cache of the target block into the blockchain database corresponding to the target blockchain.

For the specific implementation of the block screening unit 141 and the data writing unit 142, reference may be made to the description about S103 in the embodiment corresponding to FIG. 3, and details are not described herein again.

The longest chain determination module 14 is further configured to write the target cached data in the first block cache into the blockchain database corresponding to the target blockchain in response to determining, in the node internal memory, that the first block belongs to the longest chain on the bifurcated blockchain.

In an embodiment, in a case that the transaction includes a first transaction and a second transaction, the target cached data includes first cached data corresponding to the first transaction and second cached data corresponding to the second transaction; the second transaction is a previous transaction of the first transaction;

the longest chain determination module 14 may be configured to write the first cached data in the first block cache into the blockchain database corresponding to the target blockchain, and write the second cached data in the first block cache into the blockchain database.

The chain reading cache contains: historical chain data; the historical chain data includes data that is successfully written into a historical block cache of the target blockchain at a historical time; and the historical block cache is a write cache of a historical block in the bifurcated blockchain, and a block generation timestamp of the historical block is earlier than a block generation timestamp of the target block.

The chain reading data storage module 15 is configured to take the data in the target block cache as target chain data on the target blockchain, write the target chain data into the chain reading cache, and update the historical chain data in the chain reading cache with the target chain data.

A bifurcated block with a same block height as that of the target block exists on the bifurcated blockchain.

The hash table acquisition module 16 is configured to determine a target block height of the target block in the bifurcated blockchain, acquire a hash relationship table from the node internal memory, and determine a target list column where the target block height is located in the hash relationship table.

The bifurcated cache determination module 17 is configured to acquire a bifurcated block hash value of the bifurcated block from the target list column, and determine a bifurcated block cache corresponding to the bifurcated block hash value in the write cache mapping relationship table.

The data clearing module 18 is configured to clear away the target chain data in the target block cache, and clear away data in the bifurcated block cache.

The cache capacity monitoring module 19 is configured to determine a block that satisfies a cache duration condition in the bifurcated blockchain to be a block to be destroyed in response to monitoring that a cache capacity of the node internal memory reaches a cache threshold.

The destruction processing module 20 is configured to perform block destruction processing on the block to be destroyed in the bifurcated blockchain.

For the specific implementation of the transaction acquisition module 11, the contract invoking module 12, the transaction execution module 13, and the longest chain determination module 14, reference may be made to the description about S101 to S103 in the embodiment corresponding to FIG. 3, and details are not described herein again. The specific implementations of the chain reading data storage module 15, the hash table acquisition module 16, the bifurcated cache determination module 17, the data clearing module 18, the cache capacity monitoring module 19, and the destruction processing module 20 may refer to the descriptions of S201-S208 in the embodiment corresponding to FIG. 10, and will not repeatedly described here. It may be understood that, the description of beneficial effects of the same method is not described herein again.

Figure 14:
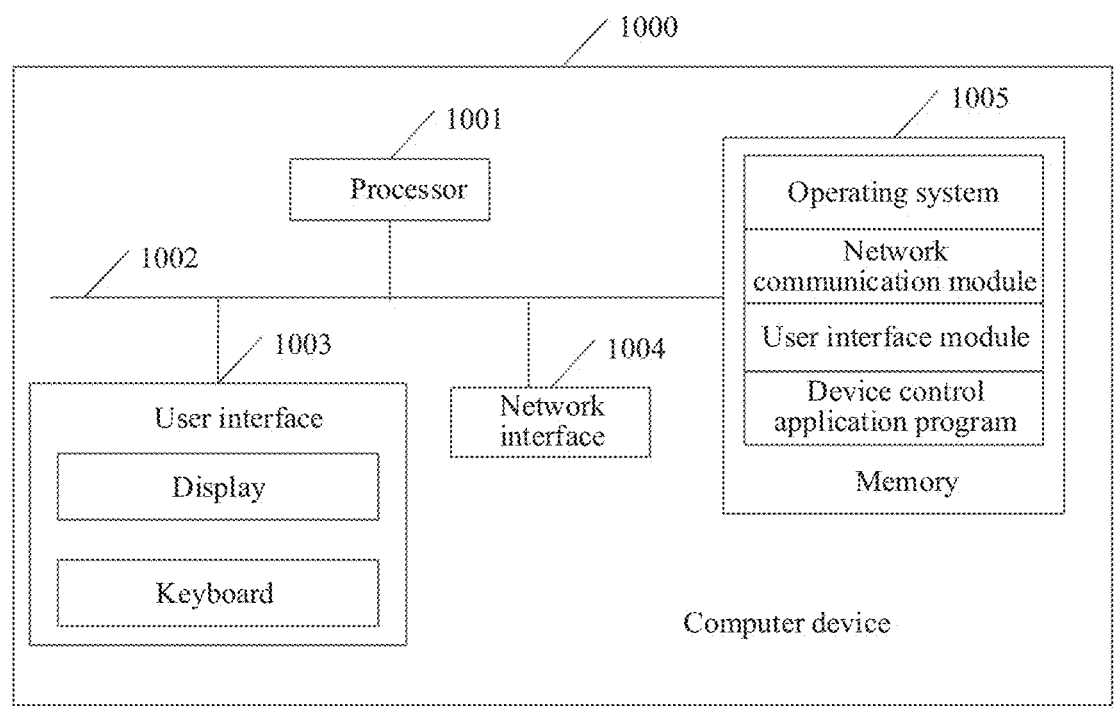
FIG. 14 is a schematic structural diagram of a computer device provided by an embodiment of the disclosure.

FIG. 14 is a schematic structural diagram of a computer device provided by an embodiment of the disclosure. As shown in FIG. 14, a computer device 1000 may be applied to the blockchain node in the embodiment corresponding to FIG. 1. The computer device 1000 may include: a processor 1001, a network interface 1004, and a memory 1005. In addition, the computer device 1000 may further include: a user interface 1003 and at least one communication bus 1002. The communication bus 1002 is configured to implement connection and communication between these components. The user interface 1003 may include a display, a keyboard, and optionally, the user interface 1003 may further include a standard wired interface and a standard wireless interface. Optionally, the network interface 1004 may include a standard wired interface and a standard wireless interface (such as a Wi-Fi interface). The memory 1004 may be a high-speed RAM, or may be a non-volatile memory, for example, at least one magnetic disk memory. Optionally, the memory 1005 may be at least one storage apparatus that is located far away from the foregoing processor 1001. As shown in FIG. 14, the memory 1005 used as a computer storage medium may include an operating system, a network communication module, a user interface module, and a device-control application program.

The network interface 1004 in the computer device 1000 may further provide a network communication function, and the optional user interface 1003 may further include a display and a keyboard. In the computer device 1000 shown in FIG. 14, the network interface 1004 may provide a network communication function, and the user interface 1003 is mainly configured to provide an input interface for a user. The processor 1001 may be configured to invoke a device control application program stored in the memory 1005, so as to achieve:

acquire a transaction in a first block, and acquire a data reading contract associated with the transaction from a chain reading cache of the node internal memory; the first block being a block to be written into a bifurcated blockchain in the node internal memory.

invoke the data reading contract to acquire a write cache mapping table associated with the first block, and determine target read data associated with the transaction based on a first block cache of the first block in the write cache mapping table; and execute the transaction based on the target read data, take a target execution result corresponding to the transaction as target cached data, store the target cached data to the first block cache, and write the first block into the bifurcated blockchain.

It is to be understood that the computer device 1000 described in this embodiment of the disclosure may implement the descriptions of the data processing method based on a node internal memory in the foregoing embodiments corresponding to FIG. 3 or FIG. 10, and may also implement the data processing apparatus 1 based on a node internal memory in the foregoing embodiment corresponding to FIG. 13. Details are not described herein again. In addition, the description of beneficial effects of using the same method are not described herein again.

In addition, an embodiment of the disclosure may further provide a computer storage medium. The computer storage medium stores a computer program executed by the data processing apparatus 1 based on a node internal memory mentioned above, and the computer program includes program instructions. When executing the program instructions, the processor may implement the descriptions of the data processing method based on a node internal memory in the foregoing corresponding embodiments corresponding to FIG. 3 or FIG. 10. Therefore, details are not described herein again. For technical details that are not disclosed in the embodiment of the computer storage medium of the disclosure, refer to the descriptions of the method embodiments of the disclosure.

A person of ordinary skill in the art would understand that all or some of the processes of the methods in the foregoing embodiments may be implemented by a computer program instructing relevant hardware. The program may be stored in a computer-readable storage medium. During the execution of the program, processes of the foregoing method embodiments may be included. The storage medium may be a magnetic disk, an optical disc, a read-only memory (ROM), a random access memory (RAM), or the like.

When a blockchain node (for example, a full node in a blockchain network) in an example embodiment of the disclosure acquires a first block (for example, a block to be written into the bifurcated blockchain generated by packing), a write cache may be pre-established for the first block, and the write cache established for the first block may be collectively referred to as a first block cache; and a mapping relation between the first block and the first block cache may be added to a write cache mapping table. In this way, when the blockchain node needs to verify a transaction in the first block, the blockchain node may quickly acquire a data reading contract (e.g., a hot-spot contract) associated with the transaction from a chain reading cache in a node internal memory), and then may invoke the data reading contract to acquire the aforementioned write cache mapping table, so as to quickly access the first block cache of the first block in the write cache mapping table. At this time, the blockchain node may quickly acquire target read data associated with the transaction, thereby improving the data access efficiency. The blockchain node may execute the transactions recorded in the first block based on the target read data, so that when the verification of these transactions is successfully completed, transaction execution results of the corresponding transactions may be written into the first block cache of the first block respectively. For example, when the blockchain node traverses and executes these transactions according to a transaction execution order during packing, the blockchain node may quickly read the transactions locally from the first block cache, thereby improving the data access efficiency. In addition, by means of introducing the write cache mapping table (e.g., a cache management mechanism that supports bifurcation) in the embodiments of the disclosure, during a consensus confirmation process for the first block, the transaction execution results of the transactions in the first block that are temporarily not determined to belong to the longest chain are taken as target cached data to store to the first block cache. In this way, after completing the consensus confirmation of the first block, the blockchain node may allow the first block to be written into a bifurcated blockchain (which refers to a local blockchain that may support the bifurcation in the node internal memory here) in the node internal memory, so that a multi-level cache may be constituted in the node internal memory through hash values of these stored blocks, which may improve the data reading efficiency.

What are disclosed above are merely examples of embodiments of the disclosure, and certainly are not intended to limit the protection scope of the disclosure. Therefore, equivalent variations made in accordance with the claims of the disclosure shall fall within the scope of the disclosure.

What is claimed is:

1. A data processing method, performed by a blockchain node in a target blockchain based on a node internal memory, comprising:

acquiring a transaction in a first block, and acquiring a data reading contract, which a contract for reading data of the transaction, from a chain reading cache of the node internal memory, the first block being a block to be written into a bifurcated blockchain in the node internal memory;

invoking the data reading contract to acquire a write cache mapping table, and determining target read data based on a first block cache of the first block in the write cache mapping table; and executing the transaction based on the target read data, storing target cached data, which is obtained as a result of executing of the transaction, to the first block cache, and writing the first block into the bifurcated blockchain.

2. The method according to claim 1, wherein the chain reading cache is established for the target blockchain in a cache space of the node internal memory, and the chain reading cache is configured to temporarily store hot-spot data that is frequently accessed; the hot-spot data comprising the data reading contract.

3. The method according to claim 1, further comprising:

determining, as a target block, a block which, in the node internal memory, belongs to a longest chain on the bifurcated blockchain, and writing data in a target block cache of the target block into a blockchain database corresponding to the target blockchain; a block generation timestamp of the target block being earlier than a block generation timestamp of the first block.

4. The method according to claim 1, wherein the acquiring the transaction and the acquiring the data reading contract comprises:
acquiring the first block containing the transaction, and generating, during performing consensus processing on the first block, a transaction processing instruction containing a hot-spot reading auxiliary parameter; the hot-spot reading auxiliary parameter comprising: a contract invoking address based on which a transaction contract of the transaction is executed;
extracting the contract invoking address from the transaction processing instruction, and searching, based on the contract invoking address, a hot-spot contract matched with a contract name mapped to the contract invoking address from the chain reading cache of the node internal memory; the hot-spot contract being a transaction contract which is determined in the chain reading cache and has a cumulative access frequency greater than an access threshold; and
acquiring, as the data reading contract, the hot-spot contract matched with the contract name.

5. The method according to claim 1, wherein the transaction comprises: a target transaction for asset transferring initiated from a first user to a second user; a contract function in the data reading contract comprising a first execution function and a second execution function; the first execution function configured to read first asset data in a user account address of the first user; the second execution function configured to read a user account address of the second user;
the invoking the data reading contract and the determining the target read data comprises:
acquiring the write cache mapping table based on the data reading contract being run in a virtual machine; acquiring, as the first block cache in the write cache mapping table, a write cache mapped to a first block hash value of the first block; and acquiring a historical execution result of a historical transaction stored in the first block cache; a transaction execution order of the historical transaction being earlier than a transaction execution order of the target transaction;
searching the historical execution result of the first block cache for the user account address of the first user based on the first execution function in the data reading contract, and searching the historical execution result of the first block cache for the user account address of the second user based on the second execution function in the data reading contract;
reading the first asset data of the first user from the user account address of the first user based on the user account address of the first user being found in the first block cache; and
determining the read first asset data and the user account address of the second user to be asset reading data of the target transaction based on the user account address of the second user being found in the first block cache, and determining the target read data based on the asset reading data.

6. The method according to claim 5, wherein the bifurcated blockchain contains a second block; the second block being a previous block of the first block; the write cache mapping table containing a second block hash value of the second block;
the method further comprises:
based on the user account address of the first user being not found in the first block cache, determining a block header of the first block in the bifurcated blockchain based on the first block hash value mapped to the first block cache, and acquiring a father block hash value of the first block as the second block hash value of the second block in the block header of the first block;
acquiring the write cache mapped to the second block hash value as a second block cache in the write cache mapping relationship table; a logical query level of the second block cache being lower than a logical query level of the first block cache;
querying the user account address of the first user in the second block cache; and
reading the first asset data of the first user from the user account address of the first user based on the user account address of the first user being queried in the second block cache.

7. The method according to claim 6, wherein the bifurcated blockchain contains a first branch chain, the first branch chain containing a third block and a fourth block, the third block being a previous block of the second block, and a block generation timestamp of the fourth block being earlier than a block generation timestamp of the third block;
the write cache mapping table contains a third block hash value of the third block and a fourth block hash value of the fourth block, a logical query level of a third block cache mapped to the third block hash value being lower than the logical query level of the second block cache, and a logical query level of a fourth block cache mapped to the fourth block hash value being lower than the logical query level of the third block cache; and
the method further comprises:
querying the user account address of the first user in a blockchain database corresponding to the target blockchain based on the user account address of the first user being not found in the second block cache, the third block cache, the fourth block cache; and
reading the first asset data of the first user from the user account address of the first user based on the user account address of the first user being queried in the blockchain database.

8. The method according to claim 3, wherein the acquiring the target block, and writing the data in the target block cache of the target block into the blockchain database comprises:
acquiring a longest chain selection policy in the bifurcated blockchain, screening a block that satisfies the longest chain selection policy in the bifurcated blockchain based on a block height of the first block, and acquiring the block that satisfies the longest chain selection policy as the target block, the target block being a block cached in the node internal memory and historically written into the bifurcated blockchain; and
writing the target block into the target blockchain based on a determination, in the node internal memory, that the target block belongs to the longest chain on the bifurcated blockchain, and writing the data in the target block cache of the target block into the blockchain database corresponding to the target blockchain.

9. The method according to claim 8, wherein the chain reading cache contains historical chain data comprising data that is successfully written into a historical block cache of the target blockchain at a historical time, the historical block cache being a write cache of a historical block in the bifurcated blockchain, and a block generation timestamp of the historical block being earlier than a block generation timestamp of the target block;

the method further comprises:

acquiring the data in the target block cache as target chain data on the target blockchain, writing the target chain data into the chain reading cache, and updating the historical chain data in the chain reading cache with the target chain data.

10. The method according to claim 9, wherein a bifurcated block with a same block height as that of the target block exists on the bifurcated blockchain;

the method further comprises:

determining a target block height of the target block in the bifurcated blockchain, acquiring a hash relationship table from the node internal memory, and determining a target list column where the target block height is located in the hash relationship table;

acquiring a bifurcated block hash value of the bifurcated block from the target list column, and determining a bifurcated block cache corresponding to the bifurcated block hash value in the write cache mapping relationship table; and clearing away the target chain data in the target block cache, and clearing away data in the bifurcated block cache.

11. The method according to claim 1, further comprising:

acquiring the data reading contract from a blockchain database associated with the node internal memory based on the data reading contract being not acquired in the chain reading cache.

12. The method according to claim 3, further comprising:

writing the target cached data in the first block cache into the blockchain database corresponding to the target blockchain based on a determination, in the node internal memory, that the first block belongs to the longest chain on the bifurcated blockchain.

13. The method according to claim 12, wherein the transaction comprises a first transaction and a second transaction, the target cached data comprises first cached data corresponding to the first transaction and second cached data corresponding to the second transaction; the second transaction being a previous transaction of the first transaction;

the writing the target cached data in the first block cache into the blockchain database corresponding to the target blockchain comprises:

writing the first cached data in the first block cache into the blockchain database corresponding to the target blockchain, and writing the second cached data in the first block cache into the blockchain database.

14. The method according to claim 1, further comprising:

determining a block that satisfies a cache duration condition in the bifurcated blockchain to be a block to be destroyed based on monitoring that a cache capacity of the node internal memory reaches a cache threshold; and performing block destruction processing on the block to be destroyed in the bifurcated blockchain.

15. A data processing apparatus based on a node internal memory in a target blockchain, the apparatus being deployed on a blockchain node, comprising:

at least one memory configured to store program code; and at least one processor configured to read the program code and operate as instructed by the program code, the program code including:

transaction acquisition code configured to cause the at least one processor to acquire a transaction in a first block, and acquire a data reading contract, which is a contract for reading data of the transaction, from a chain reading cache of the node internal memory; the first block being a block to be written into a bifurcated blockchain in the node internal memory;

contract invoking code configured to cause the at least one processor to invoke the data reading contract to acquire a write cache mapping table, and determine target read data based on a first block cache of the first block in the write cache mapping table; and transaction execution code configured to cause the at least one processor to execute the transaction based on the target read data, store target cached data, which is obtained as a result of executing of the transaction, to the first block cache, and write the first block into the bifurcated blockchain.

16. The apparatus according to claim 15, further comprising:

longest chain determination code configured to cause the at least one processor to determine, as a target block, a block that, in the node internal memory, belongs to a longest chain on the bifurcated blockchain, and write data in a target block cache of the target block into a blockchain database corresponding to the target blockchain; a block generation timestamp of the target block being greater than the block generation timestamp of the first block.

17. The apparatus according to claim 15, wherein the chain reading cache is established for the target blockchain in a cache space of the node internal memory, and the chain reading cache is configured to temporarily store hot-spot data that is frequently accessed; the hot-spot data comprising the data reading contract.

18. The apparatus according to claim 15, wherein the transaction acquisition code comprises:

first block acquisition sub-code configured to cause the at least one processor to acquire the first block containing the transaction, and generate, during performing consensus processing on the first block, a transaction processing instruction containing a hot-spot reading auxiliary parameter; the hot-spot reading auxiliary parameter comprising: a contract invoking address based on which a transaction contract of the transaction is executed;

extraction sub-code configured to cause the at least one processor to extract the contract invoking address from the transaction processing instruction, and search, based on the contract invoking address, a hot-spot contract matched with a contract name mapped to the contract invoking address from the chain reading cache of the node internal memory; the hot-spot contract being a transaction contract which is determined in the chain reading cache and has a cumulative access frequency greater than an access threshold; and data reading contract acquisition sub-code configured to cause the at least one processor to acquire, as the data reading contract, the hot-spot contract matched with the contract name.

19. A computer device, comprising: a processor and a memory, the processor being connected to the memory, the memory being configured to store a computer program, and the processor being configured to invoke the computer program, to cause the computer program to perform the method according to claim 1.

20. A non-transitory computer-readable storage medium, storing a computer program, the computer program being loaded and executed by at least one processor to cause the at least one processor to perform a data processing method based on a node internal memory, including:

acquiring a transaction in a first block, and acquiring a data reading contract, which is a contract for reading data of the transaction, from a chain reading cache of the node internal memory, the first block being a block to be written into a bifurcated blockchain in the node internal memory;

invoking the data reading contract to acquire a write cache mapping table, and determining target read data based on a first block cache of the first block in the write cache mapping table; and executing the transaction based on the target read data, storing target cached data, which is obtained as a result of executing of the transaction, to the first block cache, and writing the first block into the bifurcated blockchain.

\* \* \* \* \*